(12) United States Patent
Murthy

(10) Patent No.: US 10,367,784 B2
(45) Date of Patent: Jul. 30, 2019

(54) DETECTION OF COMPROMISED CREDENTIALS AS A NETWORK SERVICE

(71) Applicant: Palo Alto Networks, Inc., Santa Clara, CA (US)

(72) Inventor: Ashwath Sreenivasa Murthy, San Francisco, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 114 days.

(21) Appl. No.: 15/281,939

(22) Filed: Sep. 30, 2016

(65) Prior Publication Data

US 2018/0097840 A1 Apr. 5, 2018

(51) Int. Cl.
*H04L 29/06* (2006.01)

(52) U.S. Cl.
CPC .......... *H04L 63/02* (2013.01); *H04L 63/1425* (2013.01)

(58) Field of Classification Search
None
See application file for complete search history.

(56) References Cited

U.S. PATENT DOCUMENTS

| | | | |
|---|---|---|---|
| 6,715,082 B1 | 3/2004 | Chang | |
| 7,142,840 B1 | 11/2006 | Geddes et al. | |
| 7,536,722 B1 | 5/2009 | Saltz | |
| 8,365,258 B2 | 1/2013 | Dispensa | |
| 9,807,104 B1* | 10/2017 | Sarra | H04L 63/1416 |
| 2001/0037469 A1 | 11/2001 | Gupta | |
| 2003/0233329 A1 | 12/2003 | Laraki | |
| 2004/0177276 A1 | 9/2004 | MacKinnon | |
| 2005/0021975 A1 | 1/2005 | Liu | |
| 2005/0216955 A1* | 9/2005 | Wilkins | H04L 63/083 726/23 |
| 2008/0005798 A1* | 1/2008 | Ross | G06F 21/33 726/26 |
| 2011/0047610 A1 | 2/2011 | Mylavarapu | |
| 2011/0321150 A1* | 12/2011 | Gluck | H04L 63/0245 726/11 |
| 2013/0191631 A1 | 7/2013 | Ylonen | |
| 2013/0254857 A1* | 9/2013 | Bajenov | G06F 21/00 726/7 |
| 2014/0108241 A1 | 4/2014 | Tunnell | |

(Continued)

FOREIGN PATENT DOCUMENTS

JP  2013122784 A * 6/2013

OTHER PUBLICATIONS

Author Unknown, Duo Access Gateway: Duo Security, downloaded on Sep. 20, 2016.
Author Unknown, Cisco, How Does RADIUS Work, Jan. 19, 2006.

*Primary Examiner* — Benjamin E Lanier
(74) *Attorney, Agent, or Firm* — Van Pelt, Yi & James LLP

(57) ABSTRACT

Techniques for detection of compromised credentials as a network service are disclosed. In some embodiments, a system, process, and/or computer program product for detection of compromised credentials as a network service includes monitoring a plurality of sessions at a firewall, logging a plurality of failed or timed out attempts to authenticate at the firewall in a log, analyzing the log for a pattern of failed or timed out attempts to authenticate at the firewall to identify potentially compromised credentials for authentication, and determining that a set of credentials for authentication have been compromised based on the analysis of the log.

22 Claims, 23 Drawing Sheets

(56) References Cited

U.S. PATENT DOCUMENTS

| | | |
|---|---|---|
| 2014/0189808 A1 | 7/2014 | Mahaffey et al. |
| 2014/0337956 A1 | 11/2014 | Korgaonkar |
| 2015/0195252 A1* | 7/2015 | Walter .................... H04L 63/08 726/6 |
| 2015/0215312 A1 | 7/2015 | Cesnik |
| 2015/0280921 A1 | 10/2015 | Geoffrey |
| 2016/0217280 A1 | 7/2016 | Oberheide |
| 2016/0306965 A1* | 10/2016 | Iyer ....................... G06F 21/552 |
| 2017/0046892 A1 | 2/2017 | Masters |
| 2017/0094510 A1 | 3/2017 | Khosravi |
| 2017/0300911 A1 | 10/2017 | Alnajem |
| 2017/0374070 A1 | 12/2017 | Shah |
| 2018/0097787 A1 | 4/2018 | Murthy |
| 2018/0097789 A1 | 4/2018 | Murthy |
| 2018/0097840 A1 | 4/2018 | Murthy |

* cited by examiner

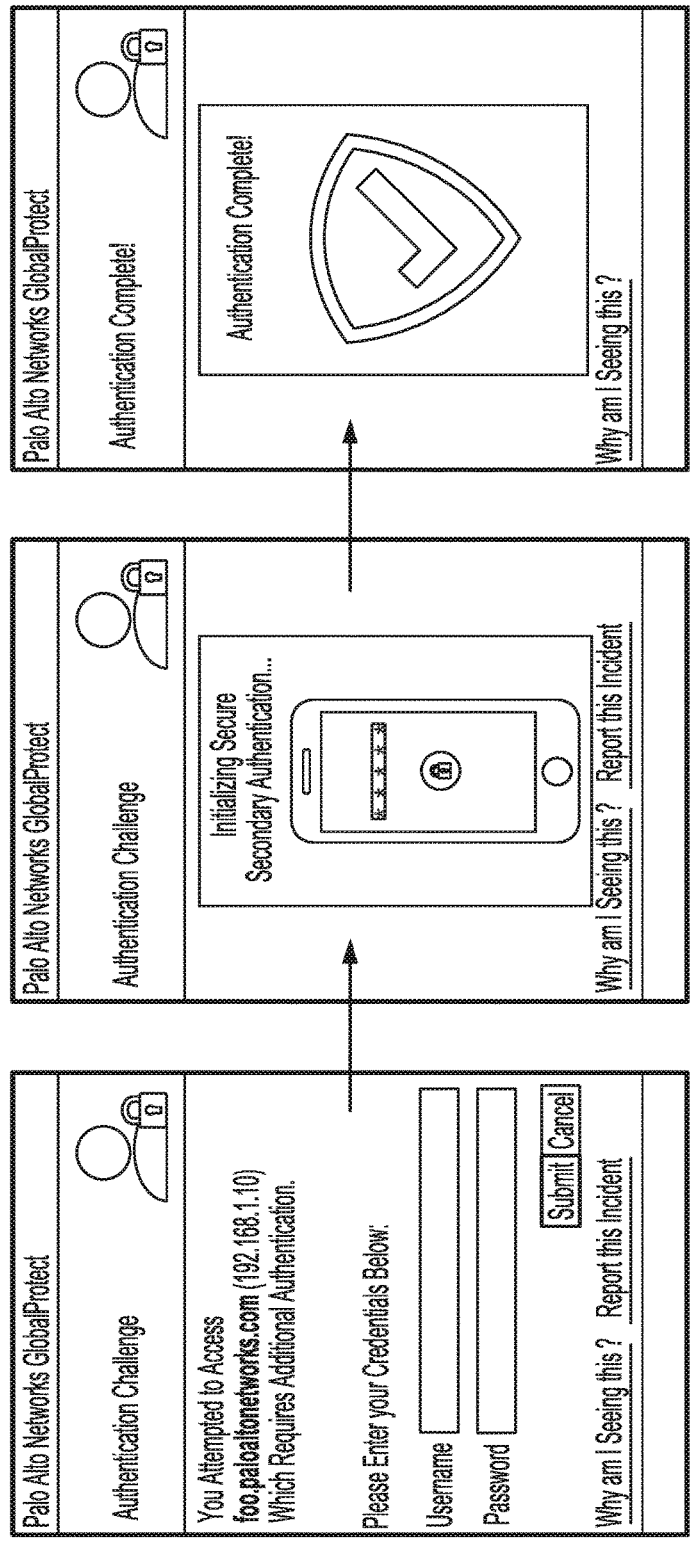

DETECTION OF COMPROMISED CREDENTIALS AS A NETWORK SERVICE

BACKGROUND OF THE INVENTION

A firewall generally protects networks from unauthorized access while permitting authorized communications to pass through the firewall. A firewall is typically a device or a set of devices, or software executed on a device, such as a computer, that provides a firewall function for network access. For example, firewalls can be integrated into operating systems of devices (e.g., computers, smart phones, or other types of network communication capable devices). Firewalls can also be integrated into or executed as software on computer servers, gateways, network/routing devices (e.g., network routers), or data appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

FIGS. 6B-D are screen diagrams of an authentication portal for a firewall implementing an authentication policy flow for performing multifactor authentication as a network service for an attempt to access a non-browser-based resource in accordance with some embodiments.

FIG. 8 illustrates an example screen shot for configuring an authentication profile in accordance with some embodiments.

FIG. 10 is an example screen shot of an interface for configuring rules for an authentication policy for performing multifactor authentication for network services in accordance with some embodiments.

FIG. 11 is an example screen shot of an interface for configuring enforcement actions for an authentication policy for performing multifactor authentication for network services in accordance with some embodiments.

DETAILED DESCRIPTION

Figure 1:
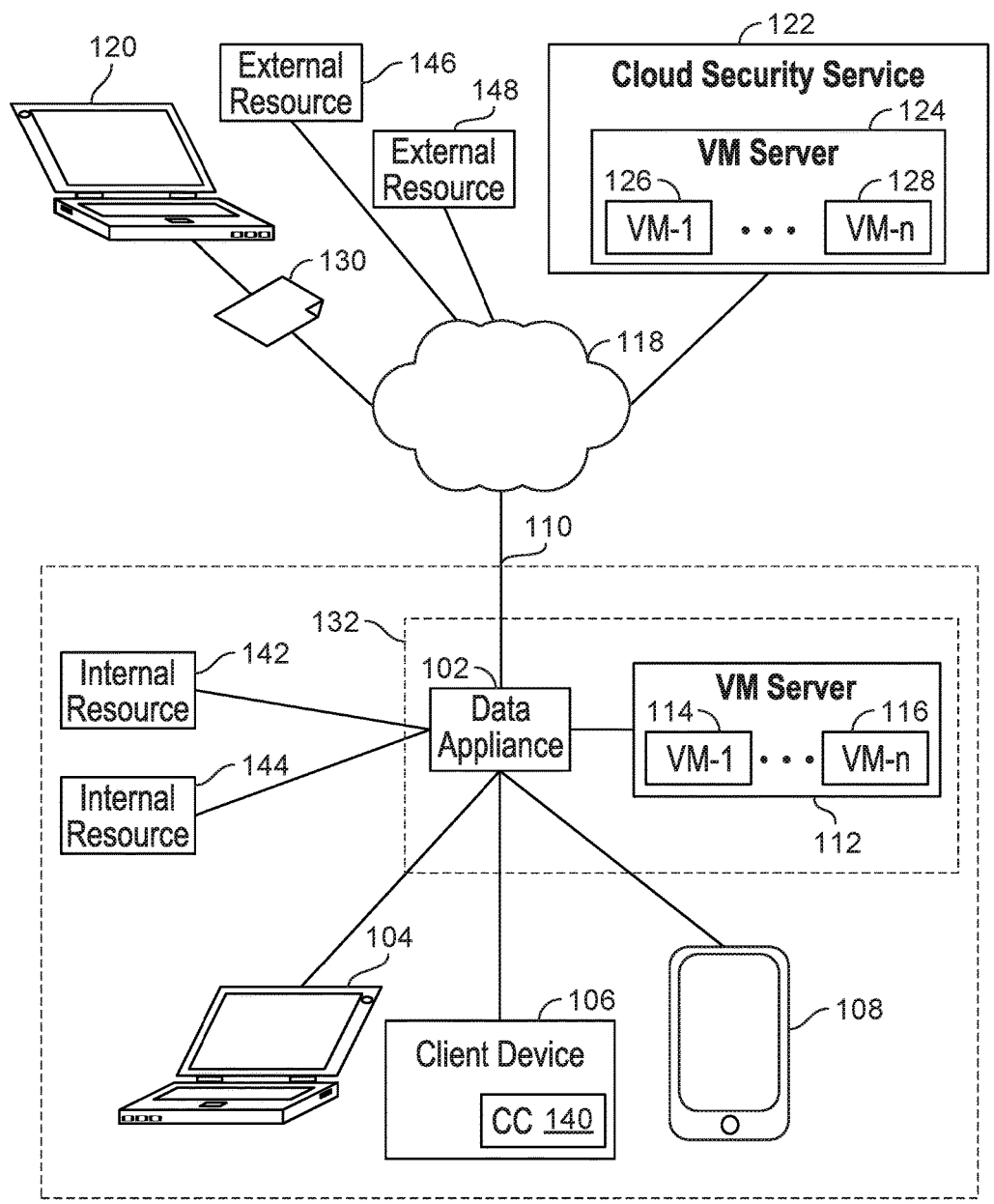
FIG. 1 is a functional diagram of an architecture for performing multifactor authentication as a network service in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as software applications on various types of devices or security devices, such as computer servers, gateways, network/routing devices (e.g., network routers), or data appliances (e.g., security appliances or other types of special purpose devices).

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall/security rules or firewall/security policies, which can be triggered based on various criteria, such as described herein).

Security devices (e.g., security appliances, security gateways, security services, and/or other security devices) can include various security functions (e.g., firewall, anti-malware, intrusion prevention/detection, proxy, and/or other security functions), networking functions (e.g., routing, Quality of Service (QoS), workload balancing of network related resources, and/or other networking functions), and/or other functions. For example, routing functions can be based on source information (e.g., source IP address and port), destination information (e.g., destination IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., using application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform stateful-based packet inspection in which each packet is examined within the context of a series of packets associated with that network transmission's flow of packets/packet flow (e.g., stateful firewalls or third generation firewalls). This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content. In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series next generation firewalls and Palo Alto Networks' VM Series virtualized next generation firewalls).

For example, Palo Alto Networks' next generation firewalls enable enterprises to identify and control applications, users, and content—not just ports, IP addresses, and packets—using various identification technologies, such as the following: App-ID™ (e.g., App ID) for accurate application identification, User-ID™ (e.g., User ID) for user identification (e.g., by user or user group), and Content-ID™ (e.g., Content ID) for real-time content scanning (e.g., controls web surfing and limits data and file transfers). These identification technologies allow enterprises to securely enable application usage using business-relevant concepts, instead of following the traditional approach offered by traditional port-blocking firewalls. Also, special purpose hardware for next generation firewalls implemented, for example, as dedicated appliances generally provide higher performance levels for application inspection than software executed on general purpose hardware (e.g., such as security appliances provided by Palo Alto Networks, Inc., which utilize dedicated, function specific processing that is tightly integrated with a single-pass software engine to maximize network throughput while minimizing latency for Palo Alto Networks' PA Series next generation firewalls).

Technical and Security Challenges with Network and Service Access Using Credentials Technical and security challenges with network and service access using credentials exist. For example, compromised credentials are one of the leading vectors that lead to a data breach. Compromised credentials (e.g., lost or stolen credentials) can be used to impersonate valid actors, with the aim of gaining access to critical resources, compromising network security, and/or exfiltrating data. In some cases, compromised credentials are lost or stolen credentials that are used by an unauthorized user (e.g., that can access resources by using stolen/lost credentials). In other cases, an endpoint is compromised (e.g., a compromised endpoint generally refers to an endpoint that has a malware kit or other malware installed and executed on it, which can access resources based on a user of the endpoint having previously entered credentials such as a Windows login and/or a VPN login). These and other compromised credentials scenarios are example technical and security challenges with network and service/application access using credentials.

The pervasive use of simple/single-factor authentication techniques exacerbates these technical and security problems. For example, once a set of credentials is compromised, it is difficult to prevent authenticated, lateral movement of a malicious actor (e.g., unauthorized/malicious user and/or malware). An adversary who has access to a set of user credentials derived via social engineering, phishing, targeted malware, or via an exploit, can freely access the applications and resources to which the (compromised) user is permitted access.

While methodologies such as 2-factor authentication (2FA) or multifactor authentication (MFA) (e.g., 2FA and MFA are also generally referred to herein as MFA) are designed to prevent this scenario from occurring, existing MFA solutions generally require a separate tie-in with each resource that needs to be protected. This requirement increases the cost of deploying an MFA solution(s), and drives up deployment complexity if multiple resources are to be secured using the MFA solution(s). This burden has typically deterred adoption and proliferation of MFA solutions to protect/secure resources, with administrators (e.g., IT/network/security administrators (admins)) preferring the simplicity associated with legacy/traditional authentication models. Coupled with intrusive user workflows and the need for users to carry authorization tokens/keys, existing approaches are barriers to the deployment and proliferation of MFA solutions at enterprises for their enterprise networks (e.g., enterprise networks generally refers to computer networks that are private networks deployed by entities, such as corporate, government, academic, non-government or other entities, and which can span public networks using virtual private networks (VPNs) or other network-based technologies).

Thus, what are needed to address these evolving technical and security challenges are new and improved techniques to efficiently and effectively facilitate network and service access using credentials and to identify compromised credentials and/or compromised endpoints.

Overview of Techniques for Performing Multifactor Authentication as a Network Service Accordingly, various techniques for providing multifactor authentication as a network service are disclosed. The disclosed techniques can facilitate efficient and enhanced security for networks and services (e.g., enterprise networks including VPNs, applications, cloud-based services, and/or other networks and services) including the deployment and enforcement of multifactor authentication (MFA) for enterprise networks as will be further described below. As used herein, MFA generally refers to two or more types of authentication, such as 2FA, 3FA, 4FA, and/or greater numbers of authentication factors.

In some embodiments, a system, process, and/or computer program product for multifactor authentication as a network service includes monitoring a session (e.g., a new or existing session) at a firewall, applying an authentication profile based on the new session, and performing an action based on the authentication profile. For example, an authentication profile can be selected based on matched criteria associated with a new session that is requesting access to a resource, which is based on a match to a rule of an authentication policy. The authentication profile can require specified multifactor authentication for access to the requested resource. If one or more of the authentication factors are not successfully satisfied or time-out, then the firewall can block access to the resource or drop the session. Otherwise (e.g., the required authentication factors are successfully satisfied), the firewall can allow access to the resource (e.g., and the firewall can perform additional security screening based on a security policy).

As another example, the disclosed techniques for multifactor authentication (MFA) as a network service can be performed using a firewall that is in a path of network traffic between a user and an example resource that requires enhanced authentication to be used as a multifactor authentication gateway (e.g., based on an authentication policy). In this example, to protect resources such as a sensitive resource, the firewall intercepts a user request to access the example resource and challenges the user to respond to a first as well as a second (or multiple) factor(s) of authentication. Once the user securely completes all of the authentication requirements, the firewall allows the user to access the requested example resource (e.g., given that the user's identity was verified in satisfaction of the authentication policy).

In this example, the actions are driven by the authentication policy. The rules of the authentication policy are evaluated each time the firewall looks-up a User ID (e.g., user identification, which can include a source IP address and username, and/or other information associated with the user/session, such as endpoint device information, port number, etc.) during a session setup, such as after receiving a first packet (or set of packets) of a new session received at the firewall as further described below (e.g., if the User ID is known or unknown for a given source IP address). Administrators can configure policies (e.g., rules of the authentication policy) which define any authentication requirements, including 2-factor or multifactor authentication, for each resource. In this example, the rules include one or more of the following configurable elements: match criteria and actions. The match criteria can include one or more of the following configurable match criteria: source zone and IP address, source user/group, destination zone and IP addresses, service and URL category, and/or additional configurable match criteria (e.g., such additional configurable match criteria can include details on the device that is originating the traffic, for example, a mobile smart phone can be challenged in a different manner than an enterprise desktop computer, such as further described below). The actions are configurable and performed based on a determined match with specified/required match criteria. The configurable actions can be performed based on the type of traffic, such as, for example, the following: web-based traffic and/or non-web-based traffic (e.g., intercept for web browsers (e.g., challenge vs. web-form), based on an authentication profile for a first authentication factor and a second or multiple authentication factors, and/or a certificate profile), such as further described below.

In one embodiment, the disclosed techniques include a configurable cache timeout (e.g., maximum time elapsed, such as in minutes) since a last successful MFA authentication for an IP/user binding that is performed for MFA enforcement, as further discussed below.

The disclosed techniques for multifactor authentication as a network service address the security and technical problems of compromised credentials (e.g., lost, stolen, or otherwise compromised credentials and/or compromised endpoint devices (endpoints)). As an example, the disclosed techniques can be performed to prevent a successful replay/reuse of compromised credentials, which can defeat a network attack such as where a malicious actor uses a set of compromised credentials to move laterally within a network. Therefore, the disclosed techniques for multifactor authentication as a network service provide a significant barrier to a malicious attack within the attack lifecycle.

The disclosed techniques for multifactor authentication as a network service also allow IT and security administrators to deploy MFA technologies to protect one or more (or all) enterprise applications and/or other resources. In contrast, to successfully deploy a multifactor authentication solution using existing technologies, it is typically required to be integrated with each and every application in the enterprise. This cost of integration is generally high, which is one of the reasons such existing technologies are typically deployed at the perimeter (e.g., VPN gateways), and not at individual applications.

Overview of Techniques for Intercept-Based Multifactor Authentication Client Enrollment as a Network Service Existing MFA approaches typically require a user to be provisioned out-of-band. In particular, users are typically required to provision soft-tokens (e.g., a mobile application) using a separate "setup" process, which is typically tied to a particular application. Also, different applications (e.g., disparate applications) that do not participate in identity sharing typically require the user to navigate through such a separate "setup" process multiple times to create separate tokens/authentication vehicles for each application.

Thus, what are needed to address these existing technical and security challenges for provisioning users for MFA are new and improved techniques to efficiently and effectively provision users for MFA for one or more applications.

Accordingly, various techniques for providing intercept-based multifactor authentication (MFA) client enrollment as a network service are disclosed. The disclosed techniques for intercept-based MFA client enrollment as a network service can facilitate efficient and enhanced security for networks and services (e.g., applications, cloud-based services, and/or other networks/services) including the deployment and enrollment of users for MFA for resources associated with enterprise networks as will be further described below.

In some embodiments, a system, process, and/or computer program product for intercept-based multifactor authentication client enrollment as a network service includes monitoring a session at a firewall, intercepting a request for access to a resource while monitoring the session at the firewall, determining that a user associated with the session is not enrolled for multifactor authentication, and initiating enrollment of the user for the multifactor authentication. For example, if the resource is associated with an authentication profile for multifactor authentication, then the firewall can trigger a workflow to initiate registration/enrollment of the user in the multifactor authentication (e.g., required for access to the requested resource based on an authentication policy). In some cases, the authentication profile may permit the user to access the resource for a grace period of time (e.g., one week, one month, or some other configurable period of time, which can include setting up the client/user enrollment in a grace period mode that allows for access for the configured grace period before requiring MFA enrollment and to not allow non-MFA access after expiration of that grace period) prior to requiring enrollment and use of the required multifactor authentication. In some cases, such as for more sensitive resources for an enterprise, there may be no grace period or a shorter grace period (e.g., one day, three days, or some other configurable period of time).

As an example, in lieu of the unwieldy approach used by existing solutions for provisioning users for MFA, a firewall is disclosed that is implemented to serve as a central MFA registration gateway for any resource (e.g., application, network, service, or other types of resources) that requires strong authentication (e.g., MFA) prior to permitting access, and for any user who is capable of providing such strong authentication credentials. Furthermore, the user does not need to learn to navigate through offline workflows to register and obtain strong authentication credentials in this example, in which the firewall can automatically establish the user's current authentication state, and if not already enrolled in a strong authentication scheme, the firewall can automatically trigger a new client enrollment to automatically navigate the user through the new MFA client enrollment process. In this example, user interaction and user behavior is not required to change as the firewall provides this MFA client enrollment service transparently if it determines that additional authentication is necessary for access to a requested resource (e.g., per an authentication policy) and the user is not enrolled into any of the available MFA schemes. In addition, the resources and applications themselves remain agnostic to the need for strong authentication as the firewall serves as an identity sharing platform (e.g., an atomic identity sharing platform), thereby providing a singular MFA registration point for each desired authentication factor. This, in turn, lessens the burden on the user, given each authentication factor is only registered once, and the user is not required to filter through multiple available credentials on the same authentication factor.

For example, the disclosed techniques for intercept-based MFA client enrollment as a network service delivers a single point of registration for all users across a network, and for all applications that desire strong authentication (e.g., MFA) prior to permitting access. By providing the capability to onboard and register new users for MFA as a network service using the disclosed techniques, this capability removes the need for the resources (e.g., applications or other resources that require strong authentication) to create their own "setup" processes (e.g., registration workflows for MFA client enrollment). Further, the disclosed techniques for intercept-based MFA client enrollment as a network service allows a given factor/authenticator to be registered just once per user, independent of the number of applications or resources this factor protects (e.g., rather than requiring each different/disparate application that does not participate in identity sharing to require the user to navigate through such a separate "setup" process multiple times to create separate tokens/authentication vehicles for each application). In turn, this provides for ease and efficiency of enrollment of users for MFA, which facilitates the adoption and deployment of MFA technologies for resources on an enterprise network.

Overview of Techniques for Detection of Compromised Credentials as a Network Service As similarly described above, compromised credentials is a significant and challenging technical and security problem for enterprises and is one of the leading vectors that lead to a data breach. For example, compromised credentials (e.g., lost or stolen credentials) can be used to impersonate valid actors (e.g., users), with the aim of gaining access to critical resources, compromise network security, and/or exfiltrate data.

Thus, what are needed to address these existing technical and security challenges are new and improved techniques to efficiently and effectively detect compromised credentials on a network.

Accordingly, various techniques for providing detection of compromised credentials on a network (e.g., an enterprise network) as a network service are disclosed. The disclosed techniques can facilitate efficient and enhanced security for networks and services (e.g., applications, cloud-based services, and/or other networks or services) including the automated and intelligent detection of compromised credentials for enterprise networks as will be further described below.

In some embodiments, a system, process, and/or computer program product for detection of compromised credentials as a network service includes monitoring a plurality of sessions at a firewall, logging a plurality of failed or timed out attempts to authenticate at the firewall in a log (e.g., an authentication log), analyzing the log for a pattern of failed or timed out attempts to authenticate at the firewall to identify potentially compromised credentials for authentication, and determining that a set of credentials for authentication have been compromised based on the analysis of the log (e.g., based on a configurable threshold of logged authentication events as further described below).

The disclosed techniques for detection of compromised credentials on a network allow for automated discovery of compromised credentials that are in use on a network. For example, a firewall can be provided with the capability to challenge a user for a second authentication factor (e.g., or any number of additional authentication factors). As a result, a set of compromised "simple" credentials (e.g., a user name and password for a first set of credentials) would not be sufficient to authenticate and prove a principal's identity. When a set of credentials is compromised, and a malicious actor leverages these credentials to authenticate to a network, the firewall can detect different behaviors that can be used to intelligently detect compromised credentials. As also described below, the disclosed techniques can be performed to detect compromised devices (e.g., compromised endpoints).

As a first example behavior, assume that the firewall monitors (e.g., intercepts and/or logs) a number of requests that exceeds a configured threshold (e.g., based on an authentication policy), bound for various networked resources (e.g., a distinct set of resources on an enterprise network) from a compromised host (e.g., a compromised endpoint or other host). In this example, this observed behavior is generally indicative of a singular (or a set of) compromised host on the network, whose credentials have been compromised, with the malicious actor performing a reconnaissance/scan on the network. As such, when the host is challenged to authenticate, the first authentication factor will succeed in this case (e.g., as the credentials for the first authentication have been compromised), and subsequent authentication factors will fail, given that the true user principal is not launching these access attempts, and the malicious actor does not have access to the second/latter factor credentials. For example, in this situation, malware on the compromised host has "assumed" the identity of the user on the host (e.g., given that the user is authenticated and the endpoint is trusted), and is attempting to launch itself into other parts of the network. As this malware attempts to move laterally within the network, the firewall will challenge it to authenticate. However, most "scripted" malware payloads are not able to respond to this challenge to authenticate (e.g., the malware is typically not sufficiently intelligent to respond to such additional authentication challenges), and hence, will "timeout" at the very first authentication challenge. As such, the firewall is capable of monitoring such events, and based on configured thresholds, can alert administrators of the presence of a compromised endpoint, as will be further described below.

As a second example behavior, assume that the firewall monitors (e.g., intercepts and/or logs) a number of requests that exceeds a configured threshold (e.g., based on an authentication policy), bound for specific or various networked resources, from a threshold number of compromised hosts. In this example, this observed behavior is generally indicative of the threshold number of hosts being used as launch points, with the malicious actor targeting a known (set of) resource(s) in an attempt to gain access to the resource(s). As such, when the firewall challenges the various endpoints to authenticate to the resource, the first factor will succeed, and latter factors will fail as similarly described above with respect to the first example.

In one embodiment, a threshold number of successful first factor authentication attempts, followed by a threshold number of failed (e.g., which can include timeouts as further described below) latter authentication factors is used as an indication of compromised credentials using the disclosed techniques as will be further described below. For example, when the firewall monitors (e.g., intercepts and/or logs) such WA-related event trails, the firewall can automatically and intelligently detect the use of compromised credentials by following various patterns (e.g., predetermined patterns and/or heuristic-based patterns) as described above and further described below.

Thus, the disclosed techniques for detection of compromised credentials on a network allow for an automated mechanism using a firewall to discover that a set of user credentials have been compromised. Differentiating legitimate, authenticated user activity from an authenticated malicious user is generally very difficult, given the user principal's credentials are valid in both scenarios. As such, providing visibility into the set of users whose credentials may have been compromised is of significant value to Information Technology (IT) and/or network/security administrators for safeguarding resources and enterprise networks.

Overview of Techniques for Time-Based Network Authentication Challenges

Various techniques for providing time-based network authentication challenges are disclosed. The disclosed techniques can facilitate efficient and enhanced security for networks and services (e.g., applications, cloud-based services, and/or other networks or services) including time-based network authentication challenges for enterprise networks as will be further described below.

In some embodiments, a system, process, and/or computer program product for time-based network authentication challenges includes monitoring a session (e.g., a new session or an existing session) at a firewall to identify a user associated with the session, generating a timestamp for an authentication factor associated with the user after the user successfully authenticates for access to a resource based on an authentication profile, intercepting another request from the user for access to the resource at the firewall, and determining whether the timestamp for the authentication factor is expired based on the authentication profile. For example, if the timestamp has expired, the firewall can enforce MFA requirements based on the authentication profile to require that the user re-authenticate in order to access the resource again.

In one embodiment, the disclosed techniques include a configurable cache timeout (e.g., maximum time elapsed, such as in minutes) since a last successful MFA authentication for an IP/user binding that is performed for MFA enforcement, as further discussed below.

For example, the disclosed techniques for time-based network authentication challenges can be used by administrators (e.g., IT/security admins) to define the integrity (e.g., strength) and validity (e.g., time) for a user's credentials (e.g., in an authentication policy), based on the resource that is being accessed on the network. This allows the user to be challenged to authenticate using multiple factors (e.g., two or more factors) for every access attempt to a sensitive resource (e.g., an Active Directory Domain Controller, a source code repository, and/or another sensitive resource), whereas the same user can be allowed to access another, less/non-sensitive resource, such as the company's intranet, by authenticating with a second factor just once in the past predetermined period of time (e.g., last 24 hours or another configuration time-out, maximum time elapsed value) based on an example authentication policy for the enterprise.

As another example, the disclosed techniques for time-based network authentication challenges can be used by administrators (e.g., IT/security admins) to chain additional authentication factors (e.g., chain multiples of knowledge, possession, and inherence factors) and/or use stronger authentication factors (e.g., answers to secret questions versus a challenge-decode-response token) based on the resource being accessed. Also, isolating the resource from the authentication and identity assurance requirements allows administrators to define fine-grained policies that allow for a successful deployment of an MFA solution(s).

Thus, the disclosed techniques for time-based network authentication challenges allow an admin (e.g., IT/network/security admin) to decouple an application or a networked resource from its authentication related security requirements. In an example implementation, the use of a firewall as an inline authenticating entity allows administrators to centrally apply and leverage strong authentication requirements when accessing sensitive resources, and apply less restrictive access control policies onto resources that are less sensitive in nature. As further described below, this can be implemented without requiring any changes to the application or resource itself, in which the firewall provides identity assurance at various degrees, as a networked service.

Example Use Case Scenarios

Various example use case scenarios will now be described that would benefit from the various disclosed techniques described above and further described below.

An example use case scenario is IT personnel for an enterprise with access to sensitive resources of the enterprise, such as Active Directory servers, source code repository servers, switches, routers, and firewalls, that are required to authenticate into these business critical systems using MFA. However, it is not easy for the IT department to enable MFA on these systems, several of which use legacy operating systems with no inherent support for MFA. To enable authentication security on these systems, IT personnel are typically forced to use different authentication schemes, weaker authentication security techniques on systems that do not natively integrate with MFA systems, and stronger MFA on systems that support these MFA technologies. Instead, they would like to impose a consistent authentication policy for multiple or all critical, sensitive, and/or other resources, secured using MFA.

Another example use case scenario is the Information Security (InfoSec) team for an enterprise would like to enable MFA to all sensitive internal applications at an enterprise network, but configuring and deploying MFA for each and every application for the enterprise is typically time consuming and expensive. Instead, InfoSec opts to require users to use Virtual Private Network (VPN) access from one internal network to another internal network, and chooses to enable MFA on that VPN gateway instead. The InfoSec team would rather not force users to VPN from one internal enterprise network to another internal enterprise network, and enforce MFA directly within the enterprise network.

As yet another example use case scenario is an enterprise would like to secure a set of critical, sensitive, and/or other internal (or external) applications with MFA. While enabling these applications with MFA is feasible, the enterprise is worried about the backlash from the user population when it comes to repeated prompts for MFA as well as the burden of deployment and client enrollment for MFA for each of these applications. Given the absence of a simple way to cache (e.g., store and share) authentication state across disparate, different applications, the enterprises continue to use simple (e.g., 1-factor authentication (1FA)) authentication techniques to secure their applications, leaving them vulnerable from an authentication security perspective as similarly described above.

Each of these various example use case scenarios would benefit from the various disclosed techniques described above as will now be further described below.

Overview of an Architecture for Performing Multifactor Authentication as a Network Service FIG. 1 is a functional diagram of an architecture for performing multifactor authentication as a network service in accordance with some embodiments. For example, such an environment can detect and/or prevent malware and/or unauthorized users from accessing an enterprise network and/or resources available on the enterprise network or otherwise causing harm and/or exfiltrating data from the enterprise network (e.g., malicious software can include any executable program, such as active content, executable code, scripts, and/or any other content that can interfere with the operation of a computing device or computer network, attempt unauthorized access of data or components of a computing device, and/or perform various other malicious, unauthorized, and/or undesirable activities). In particular, a variety of attempts by a malicious/unauthorized individual (e.g., an unauthorized user, such as a hacker or other unauthorized user) to attempt to reuse compromised credentials to access enterprise network 110 or resources on or associated with enterprise network 110 and/or attempts by a malicious/unauthorized individual to propagate malware (e.g., malware 130) via system 120 are described, as are techniques for detecting and/or preventing malware and/or unauthorized users from accessing resources on or associated with enterprise network 110.

In the example shown in FIG. 1, client devices 104, 106, and 108, are a laptop computer, a client device (e.g., a desktop computer, mobile device, or other type of client device), and a tablet (respectively) present in an enterprise network 110. Data appliance 102 is configured to enforce policies regarding communications between clients, such as clients 104 and 106, and nodes outside of enterprise network 110 (e.g., reachable via external network 118, such as the Internet). Examples of such policies include ones governing traffic shaping, quality of service, and routing of traffic. Other examples of policies include security policies such as ones requiring the scanning for threats in incoming (and/or outgoing) email attachments, web site downloads (e.g., URLs), files exchanged through instant messaging programs, and/or any other file transfers and/or communications. As further described below, another example of a policy includes an authentication policy enforced by data appliance 102 for performing various authentication rules for users to access resources on enterprise network 110 including, for example, for performing the disclosed techniques for performing WA as a network service and various other disclosed MFA-related techniques as described below.

In some embodiments, appliance 102 is also configured to enforce policies with respect to traffic that stays within enterprise network 110, such as authentication requirements for users of client devices 104, 106, and/or 108 to access internal resources 142 and/or 144 on enterprise network 110 as well as external resources 146 and/or 148, such as web sites or cloud-based applications/services available via Internet 118.

In some embodiments, client devices, such as clients 104, 106, and 108 each include a locally executed component to facilitate the disclosed techniques for performing WA as a network service. As shown, client 106 includes a client component (CC) 140 (e.g., an agent or other executable component, such as a GlobalProtect™ agent commercially available from Palo Alto Networks, Inc. or another commercially available agent) for use in the disclosed MFA related techniques, such as further described below.

Appliance 102 can take a variety of forms. For example, appliance 102 can be a dedicated device or set of devices (e.g., executing a firewall or a virtualized firewall). The functionality provided by appliance 102 can also be integrated into or executed as software on a general purpose computer, a computer server, a gateway, and/or a network/routing device. For example, in some embodiments, services provided by data appliance 102 are instead (or in addition) provided to client 104 by software executing on client 104.

Whenever appliance 102 is described as performing a task, a single component, a subset of components, or all components of appliance 102 may cooperate to perform the task. Similarly, whenever a component of appliance 102 is described as performing a task, a subcomponent may perform the task and/or the component may perform the task in conjunction with other components. In various embodiments, portions of appliance 102 are provided by one or more third parties. Depending on factors such as the amount of computing resources available to appliance 102, various logical components and/or features of appliance 102 may be omitted and the techniques described herein adapted accordingly. Similarly, additional logical components/features can be added to appliance 102 as applicable.

In an example implementation, appliance 102 can be implemented using a commercially available firewall appliance (e.g., PA-series) and/or a commercially available virtual firewall solution (e.g., VM-series) provided by Palo Alto Networks, Inc., and the cloud security service can be implemented using a commercially available security service, such as the WildFire™ cloud-based malware analysis environment provided by Palo Alto Networks, Inc. (e.g., see www.paloaltonetworks.com/products/technologies/wildfire.html).

As will be described in more detail below, appliance 102 can be configured to work in cooperation with one or more virtual machine servers to perform malware analysis/prevention (e.g., VM server 112 implemented using instrumented VM environment 114 and 116 executed by malware analysis system 132 (that includes data appliance 102) or VM server 124 implemented using instrumented VM environments 126 and 128 executed by cloud security service 122, as shown in FIG. 1, or similarly executing an instrumented VM environment on a host device/machine). As one example, data appliance 102 can be configured to provide a copy of malware 130 (e.g., a malware sample, such as a URL sample or a sample that includes additional/other content, which can include or link to potentially malicious content) to one or more of the virtual machine servers for real-time analysis (e.g., dynamic analysis using an instrumented VM environment). As another example, a cloud security service 122 can provide a list of signatures (e.g., signatures can include URL signatures of known-malicious URLs, DNS signatures, file/content signatures, and/or other signatures) to appliance 102 as part of a subscription. Those signatures can be generated by service 122 in conjunction with the techniques described herein. For example, if service 122 identifies a new malware associated with a sample (e.g., malware sample) received from a data appliance (e.g., data appliance 102 or another data appliance), cloud security service 122 can automatically generate a new signature for the newly identified malware and send the new signature to various subscribers. In this example, data appliance 102 and various other data appliances can receive subscription-based signature updates, such as for malware detected in URL samples that can be used to generate new URL signatures (e.g., malware URLs), that can then be applied by the data appliance(s) to block and/or perform other actions for network traffic associated with any such malware URLs based on a policy, such as a firewall or other security policy.

An example of a virtual machine server is a physical machine comprising commercially available server-class hardware (e.g., a multi-core processor such as a dual 6-core Intel® processor with Hyper-Threading, 4 or more Gigabytes of RAM such as a 128 GB RAM, a system disk such as a 120 GB SSD, and one or more Gigabit network interface adapters) that executes commercially available virtualization software, such as VMware ESXi, Citrix XenServer, or Microsoft Hyper-V (e.g., such a VM environment can emulate the Windows® XP operating system environment using the dual 6-core Intel® processor with Hyper-Threading and 512 MB of RAM, the Windows® 7 operating system environment using the dual 6-core Intel® processor with Hyper-Threading and 1 GB of RAM, and/or other operating system environments and/or using different hardware capacity/components). The virtual machine servers may be separate from, but in communication with, data appliance 102, as shown in FIG. 1. A virtual machine server may also perform some or all of the functions of data appliance 102, and a separate data appliance 102 is omitted as applicable. Further, a virtual machine server may be under the control of the same entity that administers data appliance 102 (e.g., virtual machine server 112); the virtual machine server may also be provided by a third party (e.g., virtual machine server 124, which can be configured to provide services to appliance 102 via third party/cloud security service 122). In some embodiments, data appliance 102 is configured to use one or the other of virtual machine servers 112 and 124 for dynamic malware analysis. In other embodiments, data appliance 102 is configured to use the services of both servers (and/or additional servers not shown). Thus, in some implementations, the cloud security service can be delivered either as a public cloud or as a private cloud (e.g., deployed locally on an enterprise network using a locally deployed data appliance or server).

Example Components of a Data Appliance

Figure 2:
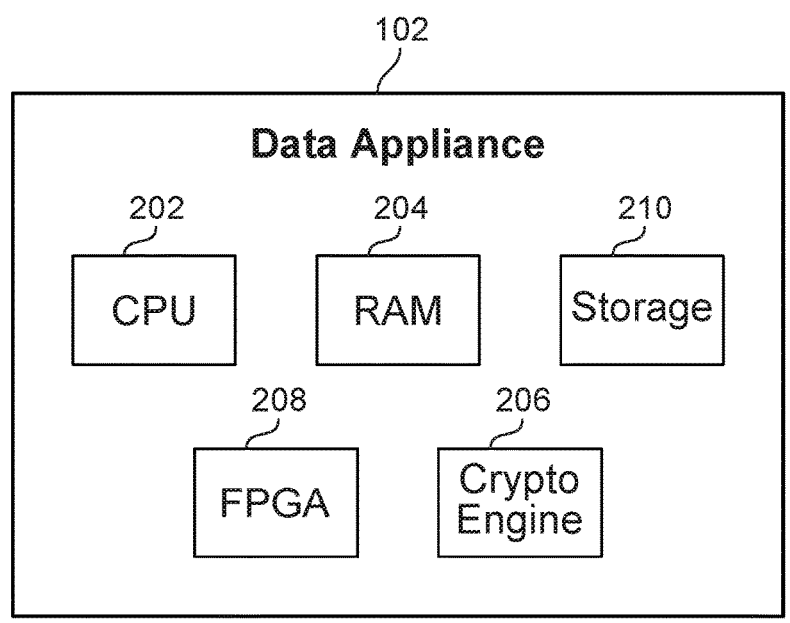
FIG. 2 illustrates a data appliance in accordance with some embodiments.

FIG. 2 illustrates a data appliance in accordance with some embodiments. The example shown is a representation of physical components that are included in data appliance 102, in some embodiments. Specifically, data appliance 102 (e.g., a device that performs various security related functions including the disclosed authentication related security functions, such as a security device, which can be in the form of, for example, a security appliance, security gateway, security server, and/or another form of a security device) includes a high performance multi-core CPU 202 and RAM

204. Data appliance 102 also includes a storage 210 (such as one or more hard disks), which is used to store policy and other configuration information. Data appliance 102 can also include one or more optional hardware accelerators. For example, data appliance 102 can include a cryptographic component 206 configured to perform encryption and decryption operations, and one or more FPGAs 208 configured to perform matching (e.g., pattern matching, such as for application identification (App ID) as further described below with respect to FIG. 3), act as network processors, and/or perform other tasks.

Figure 3:
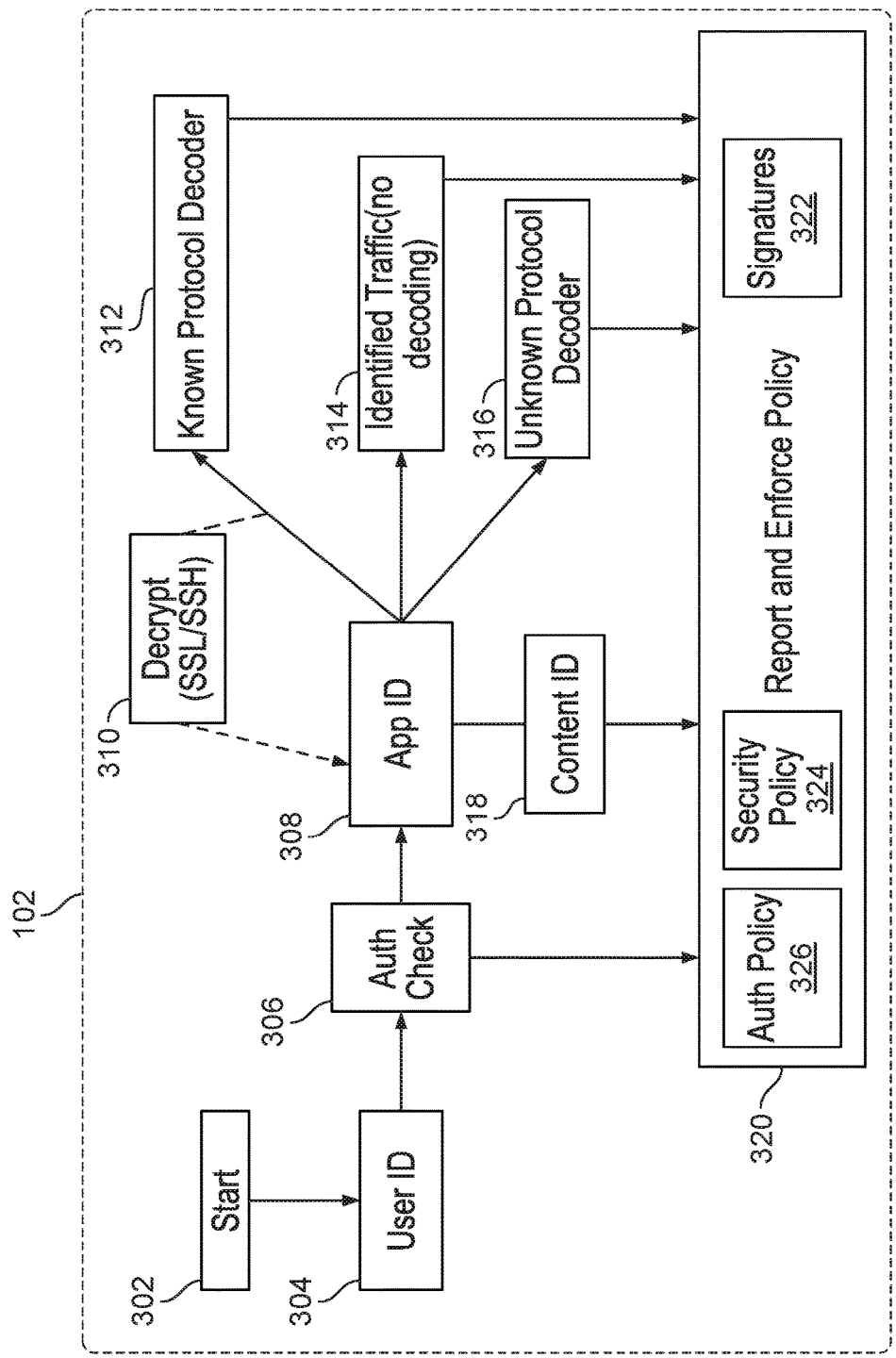
FIG. 3 is a functional diagram of an architecture of a data appliance in accordance with some embodiments.

FIG. 3 is a functional diagram of an architecture of a data appliance in accordance with some embodiments. As shown in FIG. 3, network traffic is monitored at data appliance 102. In one embodiment, network traffic is monitored using a data appliance (e.g., a data appliance that includes security functions, such as a security device/appliance that includes a firewall or a virtual firewall). In one embodiment, network traffic is monitored using a gateway (e.g., a gateway that includes security functions, such as a security gateway/network gateway firewall). In one embodiment, the network traffic is monitored using pass through (e.g., in-line) monitoring techniques.

As shown in FIG. 3, network traffic monitoring begins at 302. A User ID component 304 determines an IP address and port number for a monitored traffic flow (e.g., a session) based on packet analysis. In one embodiment, the User ID component also performs a user identification (User ID) look-up based on the IP address and port number. An Authentication (Auth) Check component 306 determines whether any policies (e.g., an authentication policy 326) can be applied based on the IP address and port number.

In one embodiment, data appliance 102 (e.g., firewall) implements an auth policy check using Auth Check component 306 at a session setup that includes performing a user ID lookup based on an IP address and, in some cases, a device type check (e.g., if the client device includes a component or another solution for providing device type information). As shown in this embodiment, a check authentication policy is performed, using Auth Check component 306 and enforced using a report and enforce policy 320 and authentication (auth) policy 326, prior to enforcing a security policy 324, such as using User ID component 304, an application (APP) ID component 308, and/or content ID component 318 and enforced using report and enforce policy 320 and security policy 324.

In one embodiment, if auth policy 326 requires MFA for a monitored session (e.g., based on a user's attempt to access a resource), then the user is directed to a portal (e.g., an authentication portal) to enter each of the authentication credentials for each of the plurality of authentication factors (e.g., starting with a first authentication factor, then a second authentication factor, etc.). If the user fails to satisfy the MFA requirements for each and every authentication factor pursuant to the auth policy for the requested resource, then access is blocked by data appliance 102 (e.g., the firewall executed by the data appliance can drop and reset the session). In some cases, if the user fails to satisfy the MFA requirements for each and every authentication factor pursuant to the auth policy for the requested resource, then a check is performed to determine if a fail counter (e.g., a failure threshold) has been exceeded (e.g., the authentication policy can permit a user to fail 1, 2, or N number of times before blocking access to the resource as described above). If the user successfully satisfies the MFA requirements for each and every authentication factor pursuant to the auth policy for the requested resource, then access is allowed by data appliance 102 (e.g., the firewall executed by the data appliance can allow the session to have access to the requested resource; however, as described above and further described below, the session can also be subjected to further security analysis by the firewall, which can also result in firewall enforcement actions that can block the user/session from accessing the requested resource or other actions can be performed by the firewall).

In one embodiment, if the user successfully satisfies the MFA requirements for each and every authentication factor pursuant to the auth policy for the requested resource, then Auth Check component 306 also generates a new timestamp that is associated with the session (e.g., at the time of the successful MFA). In an example implementation, a time to live (TTL) value is a configurable TTL parameter that is specified in each rule of the auth policy. For example, if the TTL value is configured to be 60 minutes (e.g., or some other non-zero time value configured for the TTL value for the rule), then the user would be required by the rule of the auth policy to re-authenticate if the user attempts to access the resource in a subsequent session initiated 60 minutes later (e.g., or the configured non-zero time value) from the original timestamp to again access the requested resource (e.g., in that new/subsequent session attempting to access the same resource). As another example, if the TTL value is configured to be zero minutes, then the user would be required by the rule of the auth policy to re-authenticate each new session to access the requested resource (e.g., users would be required to re-authenticate each time the user attempts to access the resource). In an example implementation, timestamps can be stored locally in a table associated with the User ID (e.g., for session, IP source and IP destination, etc.) in a data plane of the firewall implemented by data appliance 102 and can be synchronized/shared across different data appliances/firewalls (e.g., for an enterprise network) and/or can be implemented using cloud-based solutions (e.g., the disclosed techniques can be implemented to IP lock access to a web/cloud-based application/service, such as Salesforce.com or another web/cloud-based application/service, to a given IP address range allocated to the enterprise). In this embodiment, the disclosed techniques allow for the User ID (e.g., IP address, user name, and/or other information associated with the user/session) and timestamp to be used in rules of the auth policy based on access zone, destination zone, APP ID, and/or other parameters or components to require MFA configurable access requirements.

In an example implementation, Auth Check component 306 of data appliance 102 intercepts an attempt to access a resource from just a first TCP SYN packet, determines whether the request to access the resource is relevant to a rule in auth policy 326, and if so, redirects the user's session to an authentication portal as described further below. For example, such a redirect can be implemented using a transparent mode and/or a redirect mode, and each of these redirect techniques will be further described below. After the session setup and redirect, then the authentication portal is launched to challenge the user to satisfy each of the authentication factors (e.g., if pass, then proceed to each of the successive factors as specified by the applicable rule in the authentication policy for the resource) as similarly described above.

In one embodiment, an MFA configuration for one or more resources' configuration/implementation utilizes another service for SSO authentication. In an example implementation, if the user has navigated to a service/application that is redirected to an authentication system, then Auth Check component 306 of data appliance 102 redirects the user to a Single-Sign On (SSO) process that sets a cookie, and the SSO related cookie can be used as a validation for a first factor of an MFA configuration. For any additional authentication factors specified in the relevant rule of auth policy 326 for the resource, the redirect to the authentication portal to challenge for the additional authentication factors is implemented as similarly described above.

In one embodiment, authentication is performed directly/natively using a client component 140. For example, a UDP datagram (e.g., or another protocol) can be used to provide a hostname/IP check (e.g., to determine whether it is a trusted host, such as an LDAP server for ACME enterprise network, a Perforce source code repository server for ACME enterprise, or another trusted host), a unique parameter, and a URL, which client component 140 can then process (e.g., and output a predetermined message to display to the user) to redirect to the user to the authentication portal to provide a shimmy technique for redirecting users to the authentication portal.

In another embodiment, authentication is performed by redirecting users to a specific/predetermined URL for authentication (e.g., login.acmecompany.com for ACME enterprise users and configure DNSs on enterprise appropriately, and in this example, ACME enterprise users can be trained to navigate their web browser to that portal for any authentication challenges, and in this example, the authentication can be performed without using or requiring installation of client component 140 on the ACME enterprise users' client devices).

In these embodiments, whether authentication is performed directly/natively or by training users to navigate to an enterprise authentication portal, the authentication processing can then be performed as similarly described above. In some cases, an enterprise can support both of these authentication techniques to facilitate support for cases in which users are attempting access to resources from client devices that do not have client component 140 installed and/or for more flexibility of support options for their enterprise.

In one embodiment, network traffic is monitored using a state-based firewall. In one embodiment, the state-based firewall can monitor traffic flows using an application (APP) identifier (ID) component 308 in FIG. 3. For example, the monitored network traffic can include HTTP traffic, HTTPS traffic, FTP traffic, SSL traffic, SSH traffic, DNS requests, unclassified application traffic (e.g., unknown application traffic), and/or other types of traffic (e.g., traffic using other types of known or unknown protocols).

After passing an Auth Check stage of firewall processing (e.g., either no MFA requirements are applied to the session based on the auth policy or the user successfully passed the MFA requirements based on the auth policy, as similarly described above), then firewall processing proceeds to App ID 308 and Content ID 318 for applying security policy 324 using report and enforce policy 320. As shown in FIG. 3, App ID component 308 identifies an application associated with the session. For example, the application can be identified using App ID component 308 using various application signatures for identifying applications based on packet flow analysis (e.g., implemented using an FPGA, such as FPGA 208 as shown in FIG. 2). As described above, the user identification for the session can also be determined based on a source IP address (e.g., based on one or more IP addresses). In this example, App ID component 308 can be configured to determine what type of traffic the session involves, such as HTTP traffic, HTTPS traffic, FTP traffic, SSL traffic, SSH traffic, DNS requests, unknown traffic, and various other types of traffic, and such classified traffic can be directed to an appropriate decoder, such as decoder components 312, 314, and 316, to process the classified traffic for each monitored session's traffic flow.

As also shown in FIG. 3, if the monitored traffic is encrypted (e.g., encrypted using HTTPS, SSL, SSH, or another known encryption protocol), then the monitored traffic can be decrypted using a decrypt component 310 (e.g., applying trusted man-in-the-middle techniques using a self-signed certificate associated with the network device, such as a data appliance, gateway, or other network device implementing the firewall). A known protocol decoder component 312 decodes and analyzes traffic flows using known protocols (e.g., applying various signatures (322) for the known protocol) and reports the monitored traffic analysis to report and enforce policy component 320. For example, known protocol decoder component 312 can decode and analyze HTTP/HTTPS traffic flows for applying the disclosed techniques (e.g., applying a generated HTTP cookie signature to detect a malicious HTTP cookie in HTTP traffic and/or applying other malware signatures as further described below). Identified traffic (no decoding required) component 314 reports the identified traffic to the report and enforce policy component 320. An unknown protocol decoder component 316 decodes and analyzes traffic flows (e.g., applying various heuristics) and reports the monitored traffic analysis to the report and enforce policy component 320.

In one embodiment, the results of the various traffic monitoring techniques using known protocol decoder component 312, identified traffic component 314, and unknown protocol decoder component 316 described above are provided to report and enforce policies component 320 based on security policy 324 (e.g., including rules related to network/routing policies, security policies, and/or firewall policies). For example, firewall policies can be applied to the monitored network traffic using application identification, user identification, and/or other information to match signatures 322 (e.g., application/App ID signatures, such as URL signatures, file-based, protocol-based, and/or other types/forms of signatures for detecting malware or suspicious behavior) and enforce security policy 324.

As also shown, appliance 102 also includes Content ID component 318. In one embodiment, the Content ID component's identified content is also used by report and enforce policy component 320, possibly in various combinations with other information, such as application, user, and/or other information, to enforce various security/firewall policies/rules (e.g., specified in security policy 324), such as for implementing various dynamic analysis techniques as further described below.

In one embodiment, firewall policies can include a policy to further examine a sample(s) using dynamic malware analysis using the disclosed techniques such as described herein (e.g., using a local VM server 112 and/or a remote VM server of a cloud security service as described above with respect to FIG. 1). For example, a new or unknown URL (e.g., a URL that does not match an existing URL signature) and/or other content (e.g., a PDF file, a Flash (.swf format) file, and/or other content) can be provided as a sample for such further dynamic malware analysis.

In an example implementation, one or more of the components of data appliance 102 (e.g., User ID component (304), Auth Check component (306), App ID component (308), and/or Content ID component (318)) can be implemented to facilitate the disclosed techniques as further described below. As such, FIGS. 1-3 are provided as example environments and example applications that can benefit from implementing the disclosed techniques as further described below.

Firewall for Performing Multifactor Authentication as a Network Service

In one embodiment, a firewall is configured to perform multifactor authentication (MFA) as a network service. In an example implementation, a firewall is configured to implement and enforce an authentication policy for providing MFA as a network service by intercepting network traffic between a user/client device and one or more resources that are specified to have MFA requirements in the authentication policy. As such, the firewall implements an MFA gateway to protect resources for the enterprise based on the configurations specified in the authentication policy. In this example, to protect sensitive resources, the firewall intercepts a user request to access a sensitive resource, and then launches an authentication portal to challenge the user to respond to the configured multiple factors of authentication as similarly described above. If the user securely completes/satisfies the multiple factors authentication, the firewall permits the user to access the requested resource, given it asserted the user's identity with a high degree of confidence in satisfaction of the configured MFA requirements in the authentication policy.

In one embodiment, these MFA requirements and actions are driven by the configurations specified in the authentication policy, such as similarly described above and further described below. For example, rules specified in the authentication policy can be evaluated each time the firewall performs a User-ID lookup during a session setup as similarly described above with respect to FIG. 3 and further described below.

In one embodiment, administrators configure rules in the authentication policy that define the resources that require multifactor authentication. In an example implementation, administrators configure rules in the authentication policy that define the resources that require multifactor authentication by configuring the following elements within in a rule: (1) match criteria; and (2) actions (e.g., to be performed based on satisfying configured match criteria).

Example match criteria that can be configured include one or more of the following: source zone and IP addresses, source user/group, destination zone and IP addresses, and service and URL category. Additional match criteria can also be configured based on other parameters.

Example actions that can be configured include one or more of the following: type of traffic intercept for web browsers (e.g., challenge versus web form); authentication profile for the first factor, the second (or multiple) factors and/or a certificate profile; a cache timeout (e.g., a maximum time elapsed, in minutes, since the last successful 1FA authentication for an IP/user binding, such as similarly described above); and a cache timeout (e.g., a maximum time elapsed, in minutes, since the last successful MFA authentication for an IP/user binding, such as similarly described above). Additional actions can also be configured for performing other actions.

Authentication Policy Flow

Figure 4:
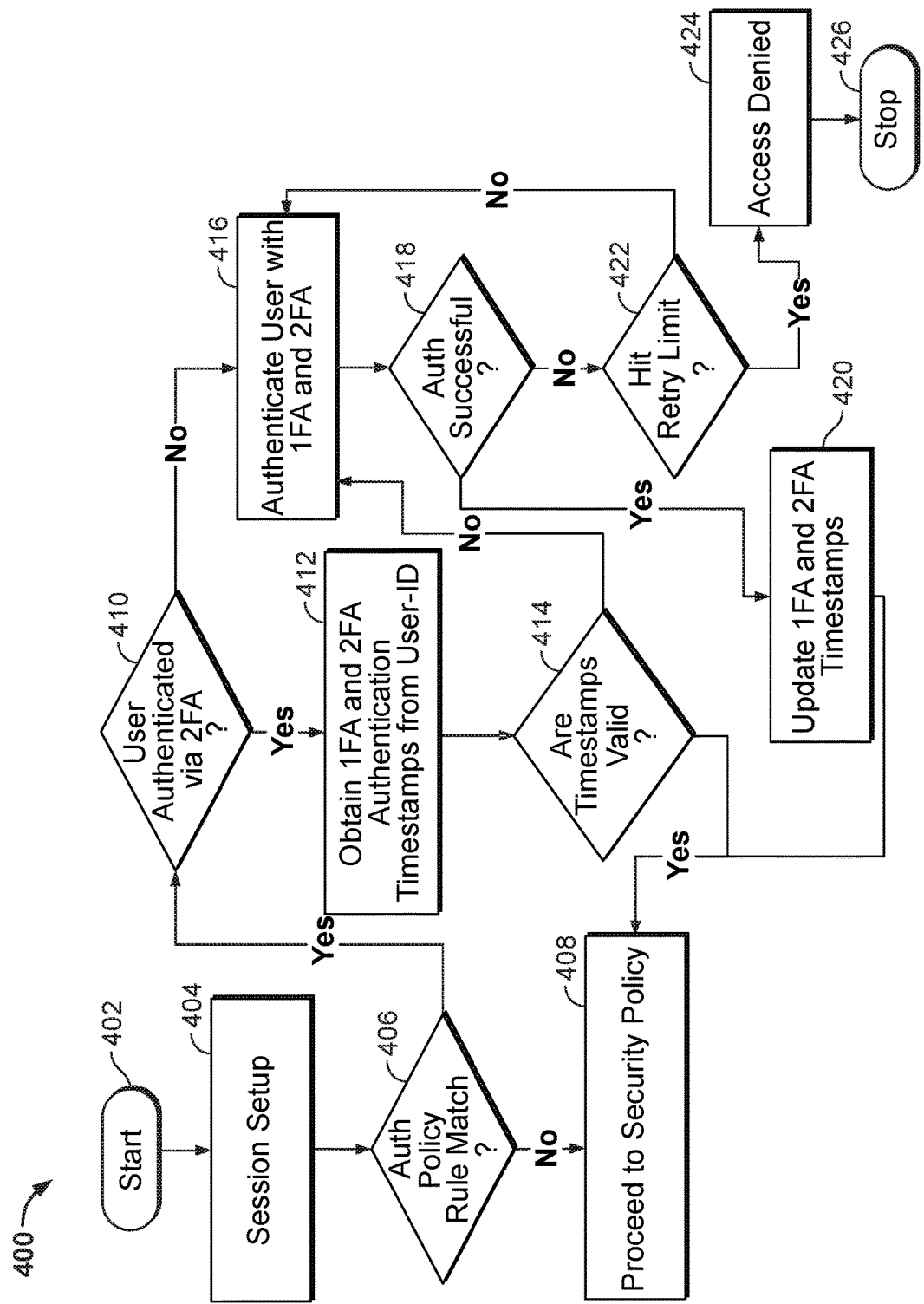
FIG. 4 is a flow diagram of a firewall implementing an authentication policy flow for performing multifactor authentication as a network service in accordance with some embodiments.

FIG. 4 is a flow diagram of a firewall implementing an authentication policy flow for performing multifactor authentication as a network service in accordance with some embodiments. In some embodiments, a process 400 as shown in FIG. 4 is performed by the platform and techniques as similarly described above including the embodiments described above with respect to FIGS. 1-3. Although process 400 is applied to an example of 1FA and 2FA authentication, it would be apparent to those of ordinary skill in the art that process 400 can similarly be applied to MFA that includes additional authentication factors (e.g., 3, 4, or N number of authentication factors).

Referring to FIG. 4, a process 400 starts at 402. At 404, a session setup is processed at the firewall (e.g., firewall implemented by data appliance 102 as similarly described above with respect to FIGS. 1-3). At 406, whether a rule(s) of an auth policy is matched is determined (e.g., based on the user ID check as similarly described above with respect to FIG. 3). If there is not a match, then the firewall proceeds to evaluate security policy rules as shown at 408. If an auth policy rule is matched, then the firewall attempts to establish the last known time at which the user successfully completed a two-factor authentication from the current source IP address as shown at 410 and 412. The first time a user matches any given rule in the auth policy rule base, this timestamp will be empty/unknown, and the firewall will proceed to challenge the user to authenticate via 2FA as shown at 416. In an example implementation, once the user authenticates successfully, the firewall will generate and store (e.g., cache) both the first factor authentication timestamp and the second authentication timestamp(s) alongside the authentication profile in use within User ID, and use these timestamps as a measure to compare any future matches on the auth policy rule base.

As shown at 414, any subsequent match on the rule base will trigger a lookup to check if the recorded 1FA/2FA timestamps are within the window defined in the auth policy rule (e.g., maximum time elapsed). In an example implementation, this match includes the timestamps and also verifies that the authentication profile (e.g., 2FA/MFA system) used is the same. Tracking the timestamp in addition to the 2FA/MFA system in use allows administrators to differentiate between multiple 2FA/MFA systems they may have deployed. For example, a SaaS provider uses both RSA SecurID and YubiKey for 2FA/MFA; IT personnel and a few select groups are required to use both, while the rest of the enterprise population only uses YubiKey for secondary authentication. Tracking the 1FA and 2FA timeouts per authentication profile allows admins to define stricter authentication requirements for IT personnel, while allowing an average enterprise user to authenticate at longer, preset intervals.

If the recorded timestamps do fall within the timeout window, then the firewall will "permit" access as per the Authentication Policy and proceed to evaluate security policy rules as shown at 408. If the 1FA/2FA timestamp is not within the desired window of time, then the firewall will proceed to challenge the user to authenticate via 1FA and 2FA as shown at 416, and update the 1FA and 2FA timestamps upon successful authentication as shown at 418 and 420. If the user does not successfully authenticate at 418, then the firewall proceeds to 422 to determine if a retry limit is hit (e.g., a configurable parameter of the rule for the resource in the auth policy). If the retry limit is not hit, then the firewall returns to 416 to allow the user another attempt to authenticate with 1FA and 2FA. If the retry limit is hit, then the firewall denies access to the resource as shown at 424 and processing stops as shown at 426.

In an example implementation, the firewall does not create/track the "per-resource" authentication state; instead, the firewall relies on these two timestamps (e.g., 1FA and 2FA timestamps) to establish the veracity of a user's attempt to access a given IP address. Relying on the timestamps instead of a per-resource authentication state provides a more liberal use of a 2FA system, which will not prompt valid users repeatedly to authenticate using the first or second factors. For example, this approach removes a significant adoption and implementation hurdle faced by enterprises for 2FA/MFA deployment, and yet permits admins to define very strong 2FA/MFA requirements when accessing sensitive resources by tuning down the timer for such timeout values.

In an example implementation, the authentication portal is implemented to natively support 2FA/MFA for a select set of third-party vendors and rely on the RADIUS protocol to interoperate with others. This is implemented using two example techniques. As a first example technique, many commercially available 2FA/MFA vendors typically publish RESTful HTTP APIs that can be invoked to challenge a user to authenticate, and verify the status of the said challenge. Where available, the auth policy, via a server profile and an authentication profile, can integrate directly with these vendors using the published APIs. As a second example technique, the authentication portal can use RADIUS as a vehicle to support vendors, such as RSA SecurID, Entrust IdentityGuard, SafeNet, and/or other vendors.

In one embodiment, different example work flows are performed depending on the type of resource. A first example work flow is performed for an attempt by a user to access a browser-based resource over HTTP(S), which is handled by the authentication portal, such as further described below. A second example work flow is performed for an attempt by a user to access a non-browser-based resource, which can be handled in one of two example ways, both of which are further described below: (1) a client component (e.g., client component 140 of FIG. 1, such as implemented using a GlobalProtect™ agent that is commercially available from Palo Alto Networks, Inc.) signals the user that (elevated) authentication is required to access the resource; or (2) the user is trained to navigate to the authentication portal, defined at a well-known URL (e.g., login.acmecompany.com), to authenticate out-of-band, which will each be further described below.

Accessing a Browser-Based Resource

Figure 5A:
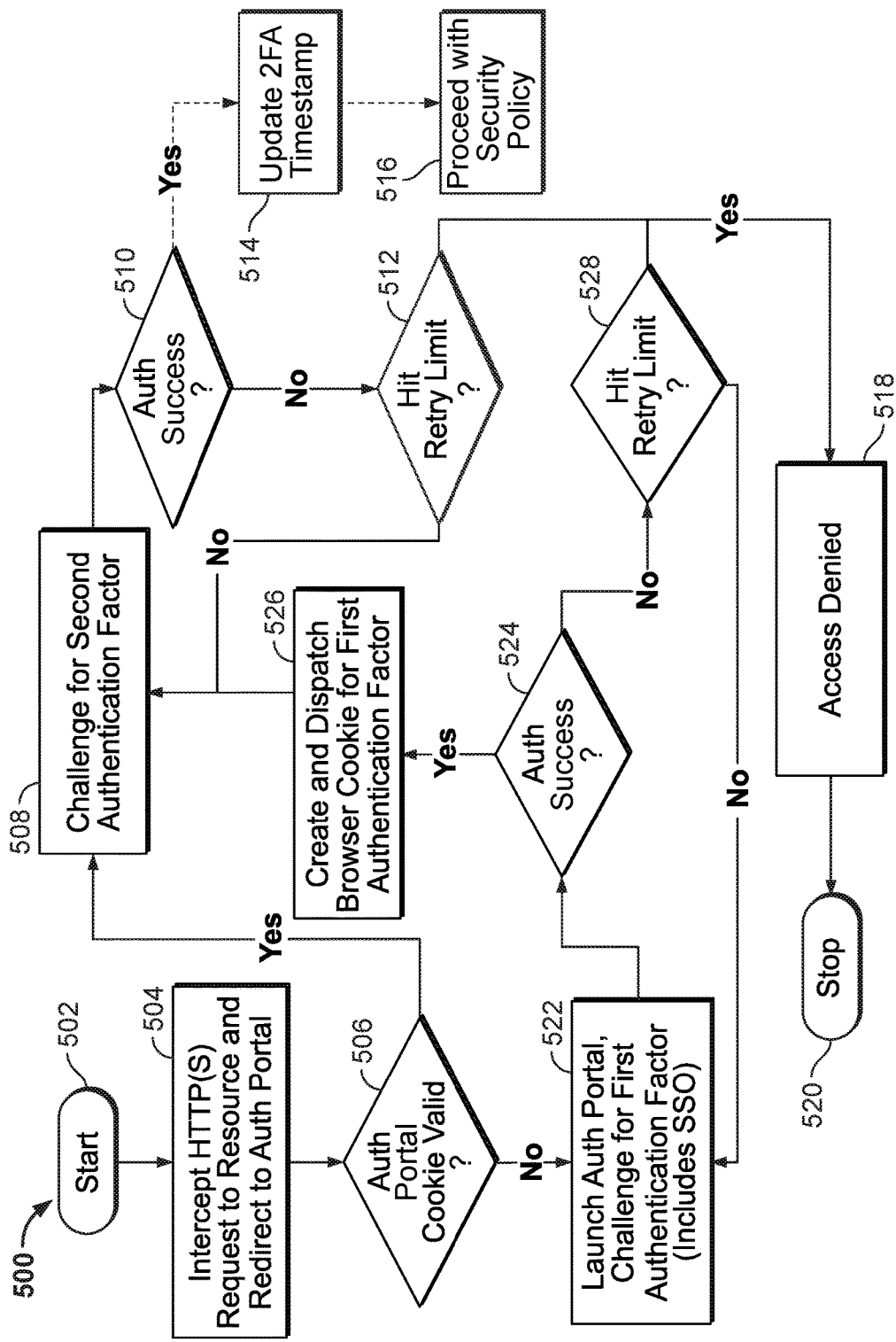
FIG. 5A is a flow diagram of a firewall implementing an authentication policy flow for performing multifactor authentication as a network service for an attempt to access a browser-based resource in accordance with some embodiments.

FIG. 5A is a flow diagram of a firewall implementing an authentication policy flow for performing multifactor authentication as a network service for an attempt to access a browser-based resource in accordance with some embodiments. In some embodiments, a process 500 as shown in FIG. 5A is performed by the platform and techniques as similarly described above including the embodiments described above with respect to FIGS. 1-3. Although process 500 is applied to an example of 1FA and 2FA authentication, it would be apparent to those of ordinary skill in the art that process 500 can similarly be applied to MFA that includes additional authentication factors (e.g., 3, 4, or N number of authentication factors).

In one embodiment, the firewall implements the logic outlined below to establish and verify the identity of a given user when a browser-based (HTTP/HTTPS) resource requires 2FA. For example, an attempt to access the browser-based resource will result in the user receiving an authentication portal that requests additional authentication. The user will encounter a workflow such as process 500 as described below, which terminates in the user being redirected to the requested resource (e.g., subject to security policy enforcement by the firewall) or denied access to the resource as described below.

Referring to FIG. 5A, the firewall processing starts at 502 after an auth policy decision is determined to authenticate the user requesting access to a browser-based resource. At 504, an HTTP(S) request to a browser-based resource is intercepted, and the session is redirected to the authentication portal. At 506, whether an authentication portal cookie is valid is determined. If the authentication portal cookie is valid, then processing proceeds to 508 to challenge for a second authentication factor. If the user successfully authenticates at 510, then the 2FA timestamp is updated at 514 and the firewall proceeds with security policy processing at 516. If the user fails to successfully authenticate at 510, and if the retry limit is hit at 512, then access is denied at 518 and processing is completed at 520. If the user fails to successfully authenticate at 510, and if the retry limit is not reached at 512, then processing returns to 508.

Referring again to 506, if the authentication portal cookie is not valid, then processing proceeds to 522 to launch the authentication portal to challenge for the first authentication factor (e.g., includes support for SSO, such as similarly described above). If the user successfully authenticates at 524, then a browser cookie for the first authentication factor is created and dispatched at 526, and the firewall proceeds with processing at 508 to challenge for the second authentication factor. If the user fails to successfully authenticate at 524, and if the retry limit is hit at 528, then access is denied at 518 and processing is completed at 520. If the user fails to successfully authenticate at 524, and if the retry limit is not reached at 528, then processing returns to 522.

Figure 5B:
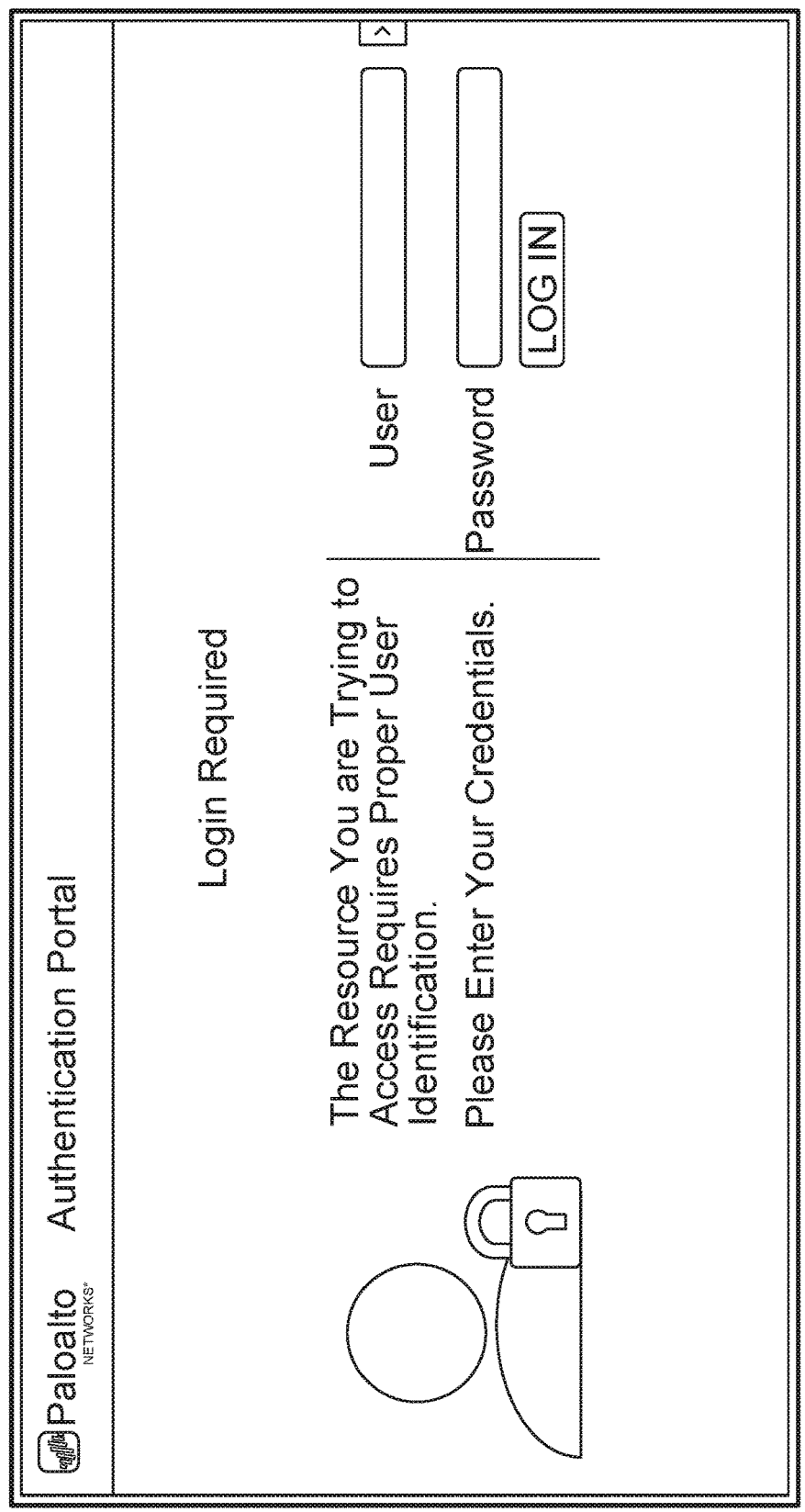
FIGS. 5B-D are screen diagrams of an authentication portal for a firewall implementing an authentication policy flow for performing multifactor authentication as a network service for an attempt to access a browser-based resource in accordance with some embodiments.
Figure 5C:
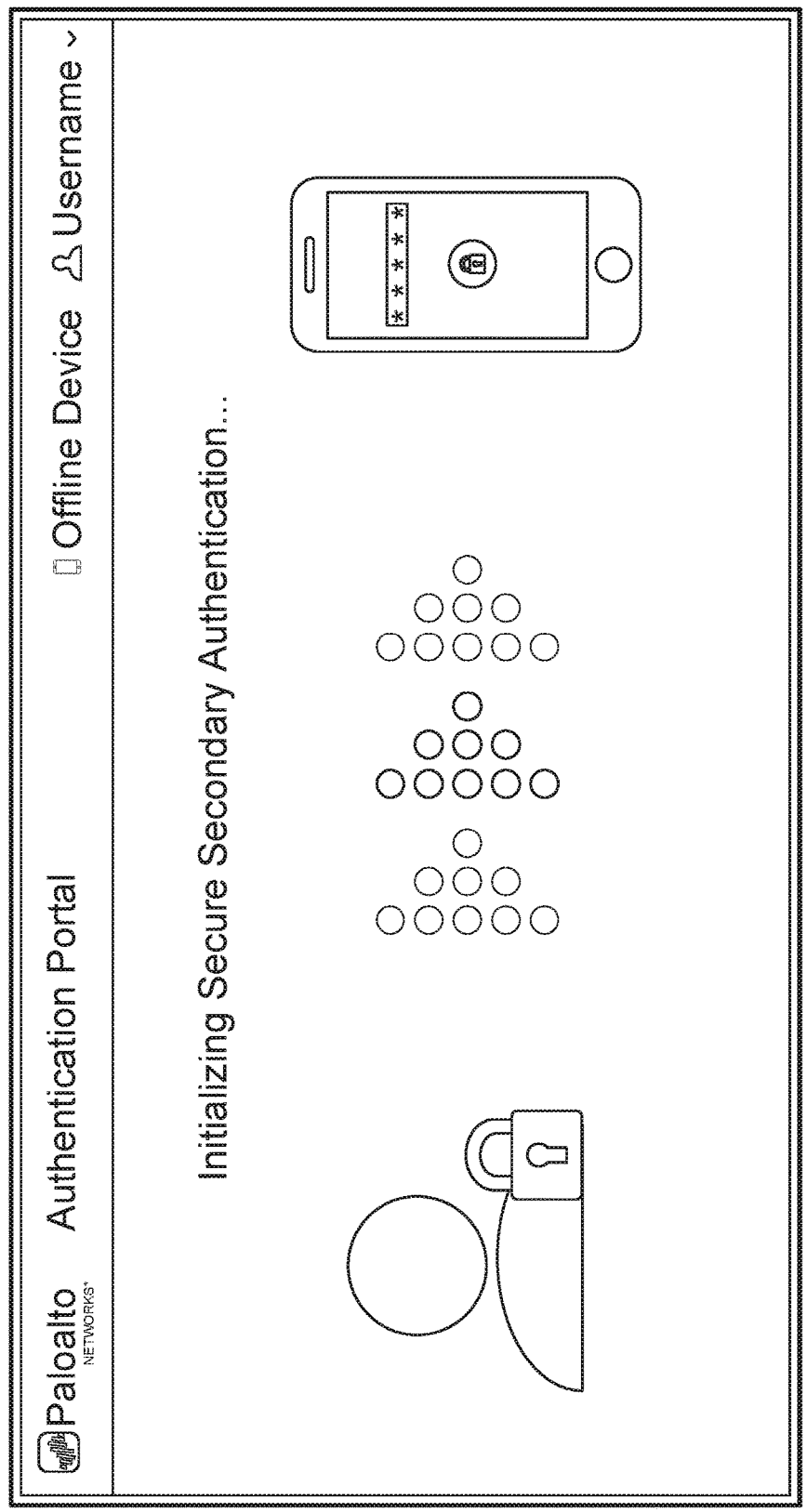
Figure 5D:
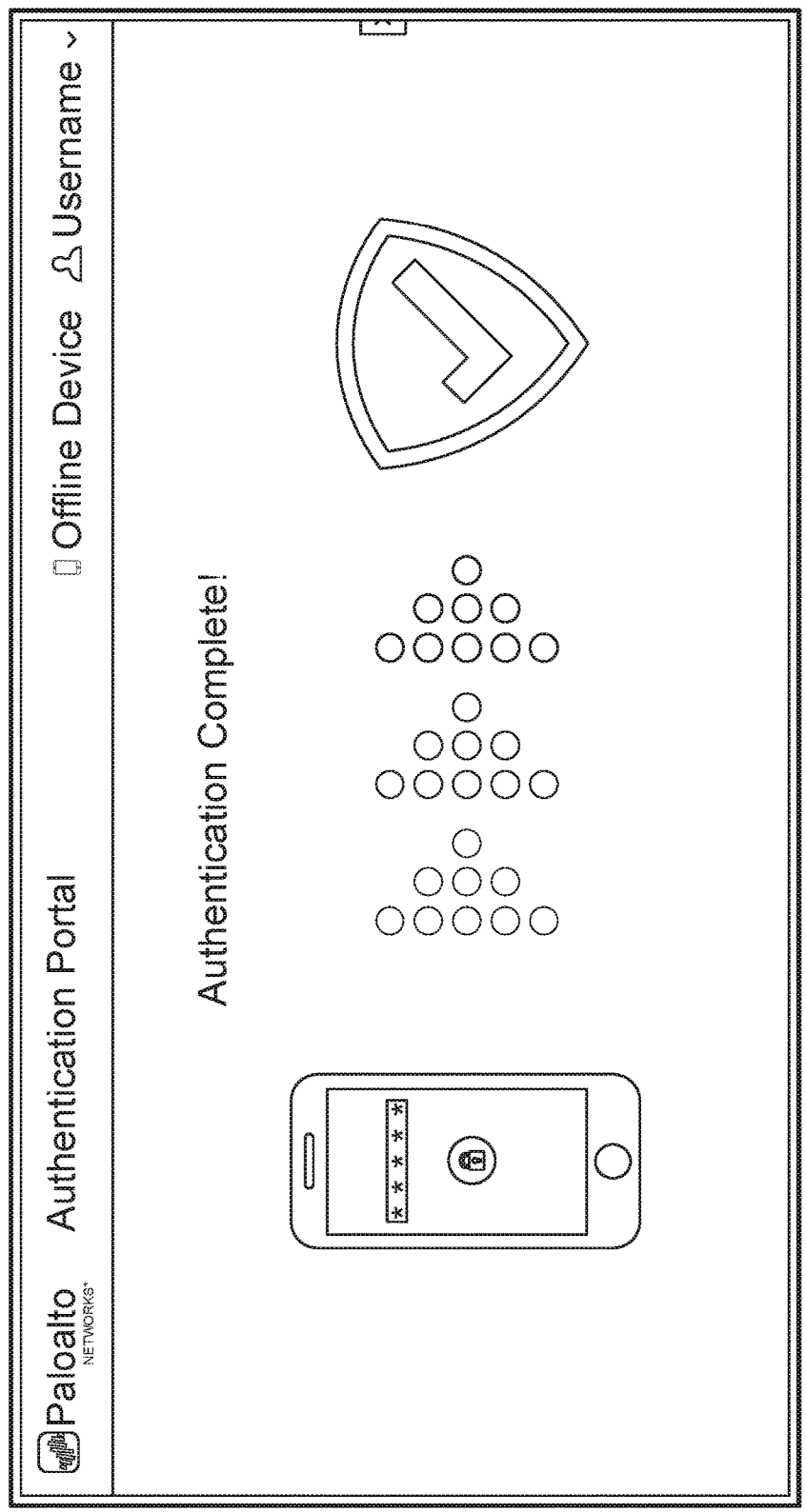

FIGS. 5B-D are screen diagrams of an authentication portal for a firewall implementing an authentication policy flow for performing multifactor authentication as a network service for an attempt to access a browser-based resource in accordance with some embodiments. Referring to FIG. 5B, a screen diagram of an authentication portal for a first authentication factor challenge (e.g., username and password) is shown. Referring to FIG. 5C, a screen diagram of the authentication portal for proceeding to a secure second authentication factor challenge is shown. Referring to FIG. 5D, a screen diagram of the authentication portal for a successful authentication result is shown.

Accessing a Non-Browser-Based Resource

Figure 6A:
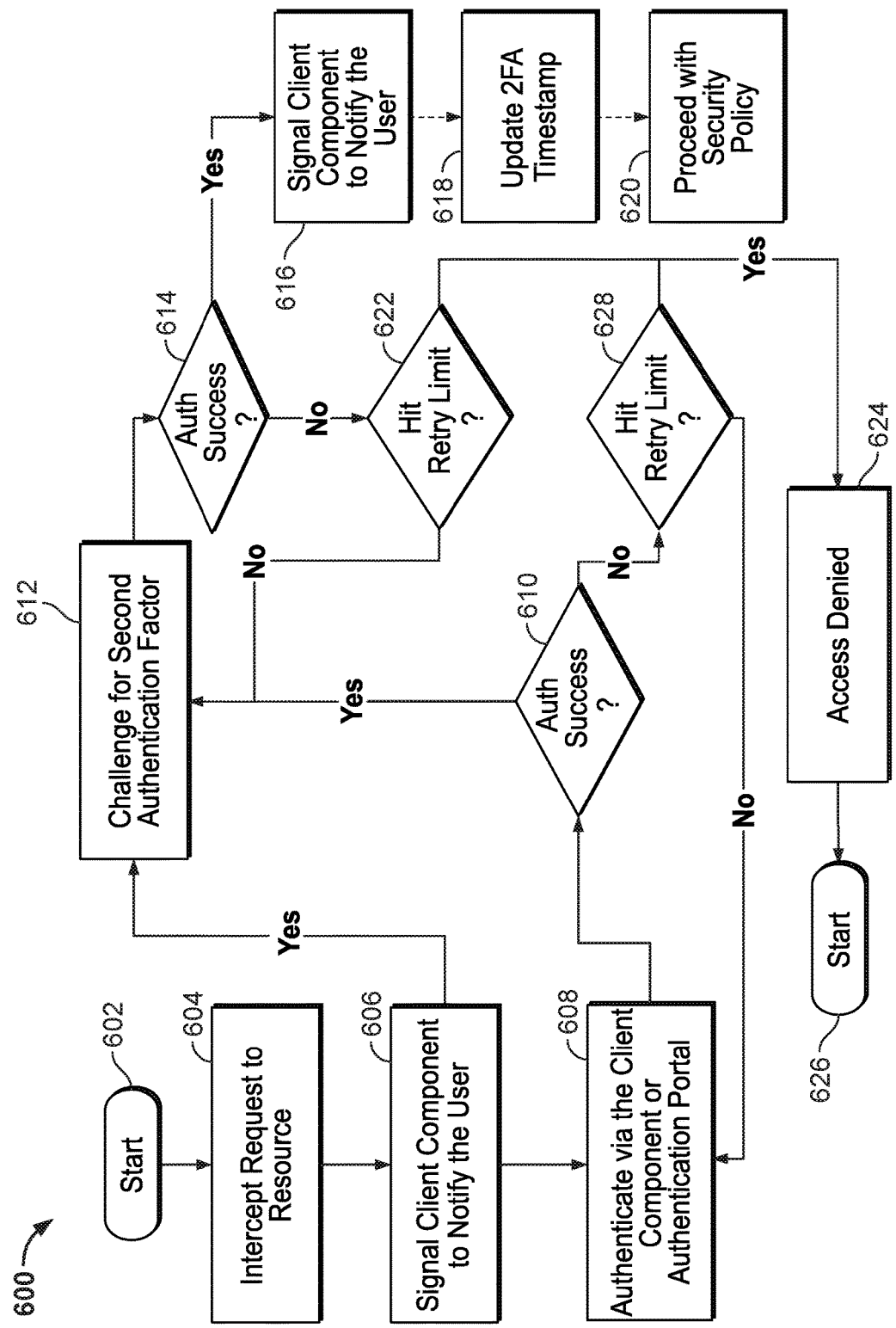
FIG. 6A is a flow diagram of a firewall implementing an authentication policy flow for performing multifactor authentication as a network service for an attempt to access a non-browser-based resource in accordance with some embodiments.

FIG. 6A is a flow diagram of a firewall implementing an authentication policy flow for performing multifactor authentication as a network service for an attempt to access a non-browser-based resource in accordance with some embodiments. In some embodiments, a process 600 as shown in FIG. 6A is performed by the platform and techniques as similarly described above including the embodiments described above with respect to FIGS. 1-3. Although process 600 is applied to an example of 1FA and 2FA authentication, it would be apparent to those of ordinary skill in the art that process 600 can similarly be applied to MFA that includes additional authentication factors (e.g., 3, 4, or N number of authentication factors).

In one embodiment, the firewall implements the logic outlined below to establish and verify the identity of a given user when a non-HTTP/non-HTTPS resource requires 2FA. For example, an attempt to access the non-browser-based resource (e.g., non-HTTP/non-HTTPS resource) will result in the user receiving an authentication portal that requests additional authentication. The user will encounter a workflow such as process 600 as described below, which terminates in the user being notified of a successful authentication and the potential need to relaunch the application that requested network access (e.g., subject to security policy enforcement by the firewall) or denied access to the resource as described below.

In this example implementation, the client device is configured with an installed client component (e.g., client component 140 of FIG. 1, such as a GlobalProtect™ agent on the endpoint), so that a user can be notified of an access attempt that was blocked because the resource required user authentication. As would be apparent to those of ordinary skill in the art, another type of client component can similarly be deployed to perform similar functions for performing the below described process of FIG. 6A. In addition, if such a client component is not in use (e.g., is not installed on the client device/endpoint or it cannot trigger a user notification), then the user will be allowed to navigate to the authentication portal (e.g., as configured/defined by the administrator) hosted on the firewall to complete the authentication process.

Referring to FIG. 6A, the firewall processing starts at 602 after an auth policy decision is determined to authenticate the user requesting access to a non-browser-based resource. At 604, an attempt to access the resource is intercepted at the firewall. At 606, the firewall signals the client component (e.g., a GlobalProtect™ agent or another client component) to generate a notification to the user that requests the user for additional authentication. At 608, the user attempts to authenticate using the client component or the authentication portal. If the user successfully authenticates for a first authentication factor at 610, then processing proceeds to 612 to challenge for the second authentication factor. If the user fails to successfully authenticate at 614, and if the retry limit is hit at 622, then access is denied at 624 and processing is completed at 626. If the user fails to successfully authenticate at 614, and if the retry limit is not reached at 622, then processing returns to 612. If the user successfully authenticates at 614, then the firewall signals the client component (e.g., a GlobalProtect™ agent or another client component) to notify the user of the successful authentication at 616, and then the 2FA timestamp is updated at 618, and the firewall proceeds with security policy processing at 620.

Referring again to 610, if the user fails to successfully authenticate at 610, and if the retry limit is hit at 628, then access is denied at 624 and processing is completed at 626. If the user fails to successfully authenticate at 610, and if the retry limit is not reached at 628, then processing returns to 608.

FIGS. 6B-D are screen diagrams of an authentication portal for a firewall implementing an authentication policy flow for performing multifactor authentication as a network service for an attempt to access a non-browser-based resource in accordance with some embodiments. Referring to FIG. 6B, a screen diagram of an authentication portal for a first authentication factor challenge (e.g., username and password) is shown. Referring to FIG. 6C, a screen diagram of the authentication portal for proceeding to a secure second authentication factor challenge is shown. Referring to FIG. 6D, a screen diagram of the authentication portal for a successful authentication result is shown.

In one embodiment, administrators (e.g., IT/network/security admins) can configure the authentication policy and/or other aspects of the authentication portal and configuration of users and/or resources for implementing the disclosed techniques of providing MFA as a network service using an admin graphical user interface (GUI) and/or command line interface (CLI).

In one embodiment, if an authentication profile is configured with an MFA vendor that the firewall integrates with using APIs for the MFA vendor, then the first factor is handled independent of the latter factors (e.g., second, third, etc. authentication factors). In this example, the user is first authenticated with the first factor as configured on the authentication profile. In an example implementation, upon successful completion of the first factor, the firewall uses the vendor provided APIs to trigger a subsequent authentication challenge(s). If a device (e.g., client/endpoint device) is enrolled with multiple methods of authentication (e.g., push notification, SMS, secret questions as some MFA vendors allow users to create answers to secret questions, or create backup codes so the user can still authenticate if the device, such as the user's mobile device including a mobile phone, tablet, watch, or other mobile device, is offline/unavailable), then the firewall provides the user with an option to select the desired method of authentication. In this example, the user-facing entity (e.g., authentication portal/GlobalProtect) provides an option that allows a user to select a secondary method to interact with the authentication system (e.g., which allows users of devices that may be offline to authenticate using Time-based One-time Password (TOTP) codes or HMAC-based One Time Password (HOTP) codes, instead of push notifications). For example, this can take the form of a hyperlink that allows a user to indicate that the preferred/normal means of authenticating is not available or another interaction mechanism to make such a selection. The list of authentication methods available for a given user can be retrieved from the MFA provider (e.g., which is typically configured across an enterprise; in some cases, such can be configurable to vary per user of the enterprise).

In one embodiment, upon completion of the latter factor(s) of authentication, the firewall generates or updates two timestamps for 2FA (e.g., or multiple timestamps for MFA) within the User ID record for the user and IP address, and records these timestamps in addition to the authentication profile in use. These timestamps are also referred to as the "1FA last successful authentication timestamp" and "2FA last successful authentication timestamp" (e.g., and "NFA last successful authentication timestamp" for additional $N^{th}$ factor) for each distinct authentication profile, and are maintained (e.g., cached) per User ID. In an example implementation, this timestamp is distributed/communicated to other firewalls for an enterprise (e.g., sharing with other firewalls that are registered to it as agents via User ID). In this example, assuming a homogenous redistribution of User ID information among the firewalls for the enterprise, the only trigger that prompts a user for authentication (e.g., across all firewalls) is a hit/match on the authentication policy rule base. As similarly discussed above, the firewall does not generate or update the timestamp if any of the latter factor(s) of authentication are not successful. In an example implementation as also similarly discussed above, the firewall starts the authentication process from the first factor if any of the later authentication stages fail.

In one embodiment, the firewall supports multifactor authentication with RADIUS as similarly described above. For example, if an authentication profile requires MFA with RADIUS, then all authentication consumers can support a challenge/response mechanism to authenticate the user. In this example, all authentication consumers perform an interim process that presents the user with the challenge. The RADIUS server is expected to dispatch the challenge, and the challenge message to be displayed. If the response from the RADIUS server does not carry a message with the challenge, then the authentication consumer is configured to display the current default challenge message. Further, the authentication consumer presents the user with the challenge prompt and a text field to enter the challenge response in. The authentication consumer then dispatches this back to the RADIUS server for challenge verification, and processes a subsequent accept/reject response from the RADIUS server. In an example implementation, all authentication consumers support a combined MFA mechanism (e.g., entering a token along with the username) where the RADIUS server is responsible for breaking apart the first and latter factors of authentication. The user enters a username/password and the token in the same form, at the same time. Typically, the password field is overloaded to carry the password and the <n> digit token (e.g., or an alphanumeric token can be utilized). The RADIUS server is then configured to strip the token from the password field and process the 1FA and 2FA/MFA authentications separately. The RADIUS module waits for a maximum period of time (e.g., a configurable time limit, such as 120 seconds or some other time-out value) before it times out the request made to the RADIUS server. For example, this allows for asynchronous modes of input such as an SMS response code, or a hardware-based challenge/response scheme.

In one embodiment, the firewall natively supports multifactor authentication. For example, in addition to supporting and integrating with third party MFA vendors, the firewall can include a component for natively implementing MFA that can be similarly implemented to perform the disclosed MFA related techniques.

Interaction with User-ID

In one embodiment as similarly described above, the firewall will challenge previously known users (e.g., known based on the User ID component lookup) to authenticate with a second factor or multiple factors based on the authentication policy. For example, multifactor authentication provides a very high degree of confidence in the user's identity such that any authentication attempt that is successfully completed by using this example implementation also bolsters User ID accuracy. In this example, an explicit user authentication derived from the MFA gateway will supersede any existing user mappings for the originating IP address.

Interaction with Authentication

In an example implementation, the firewall configured to provide an authentication gateway using the disclosed techniques can rely on, for example, LDAP, RADIUS, TACACS+ and client certificates when SSO is not required, Kerberos or SAML when SSO is required, to satisfy the first factor. In this example, to challenge the user for a second or latter factor, the authentication gateway can provide one or both of the two options as described below and similarly described above. First, the authentication gateway can integrate with MFA vendors using their APIs, which typically take the form of RESTful HTTP-based APIs. These APIs typically require authorization tokens to be invoked; administrators may be required to configure the authorization tokens on the firewall so that it can challenge a user to authenticate. In one embodiment, a dynamic configuration and logic engine is provided for configuring the firewall that carries not only the hooks necessary to configure these MFA solutions within the firewall, but also the logic that outlines a precise sequence of events that need to be invoked so that a user is challenged to authenticate using secondary factors (e.g., including providing a data driven widget that lists the controls used to interoperate with the MFA vendor, in which the widget can be driven by dynamic content updates (e.g., which can be provided based on a framework to interpret interactions with the MFA vendor that can be implemented using a scripting language to encapsulate such interactions with the MFA vendor in a script(s)), which is also capable of inserting a new supported API vendor(s) with such a dynamic content update, and the UI renders itself to carry the configuration fields required by such a new vendor). As another and/or additional approach, the authentication gateway can integrate via RADIUS with legacy/established vendors (e.g., or newer MFA providers if API-based techniques are not available). In such cases, the enterprise network deploys a RADIUS server (e.g., or a RADIUS proxy) that provides hooks into the desired MFA ecosystem.

MFA Server Profile

Figure 7:
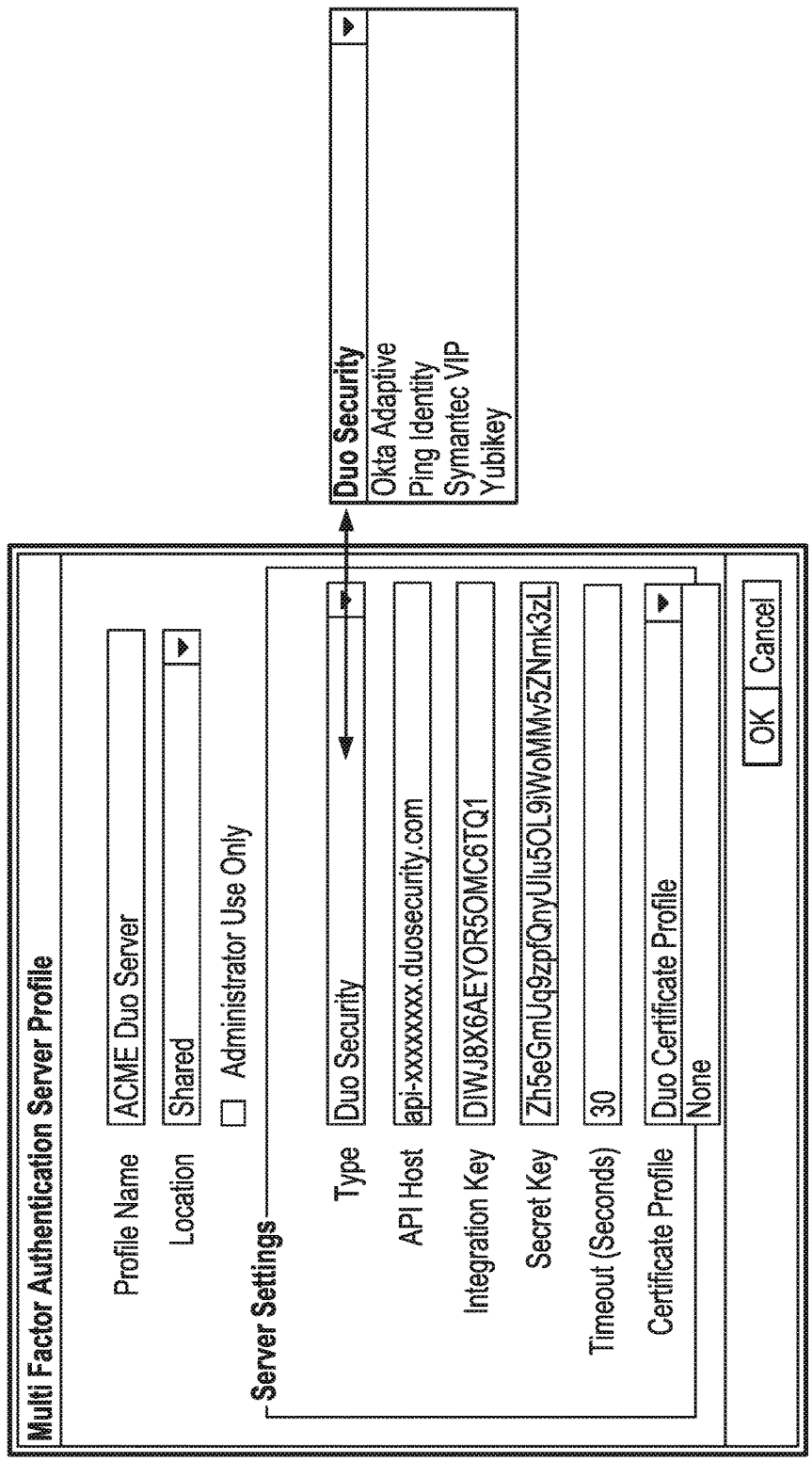
FIG. 7 illustrates an example screen shot for configuring an MFA server profile in accordance with some embodiments.

In an example implementation, a server profile of type "Multifactor Authentication" is provided, which is referred to as an MFA server profile as further described below. FIG. 7 illustrates an example screen shot for configuring an MFA server profile in accordance with some embodiments.

As shown in FIG. 7, an administrator can configure the following parameters within the MFA server profile to provide a Profile Name parameter for providing a descriptive name, a Location parameter (e.g., the target virtual system or shared), a Type (vendor) of the MFA solution parameter that can be implemented using a drop-down that lists the supported MFA vendors as shown (e.g., Duo Security, Okta, PingID, and/or other MFA vendors), an API Host parameter, an Integration Key, and Secret Key parameters (e.g., for configuring integration with Duo Security to receive and process API calls), a Timeout (e.g., in seconds, for configuring a timeout for the last successful authentication that specifies the amount of time the platform must wait before it times out an attempt to connect to this host as similarly described above), and a Certificate Profile.

In one embodiment, the MFA server profile is another location in which dynamic configuration as described herein can be applied to facilitate and efficient and seamless integration with third-party MFA vendor products (e.g., which can be provided as pushed dynamic content updates to abstract out the parameters used for each specific MFA vendor and rendering of the same in the GUI/CLI through such dynamic content updates). For example, the GUI/CLI to create these entities can be updated on-the-fly, such as to add support for a new third-party MFA vendor(s) is introduced or updated as support for an existing third-party MFA vendor(s). This approach decouples the act of configuring the firewall from the current status of a third-party MFA vendor's product, thereby allowing the firewall to seamlessly interface with third-party MFA vendors and to support the third-party MFA vendors' product updates.

Authentication Profile

Figure 8:
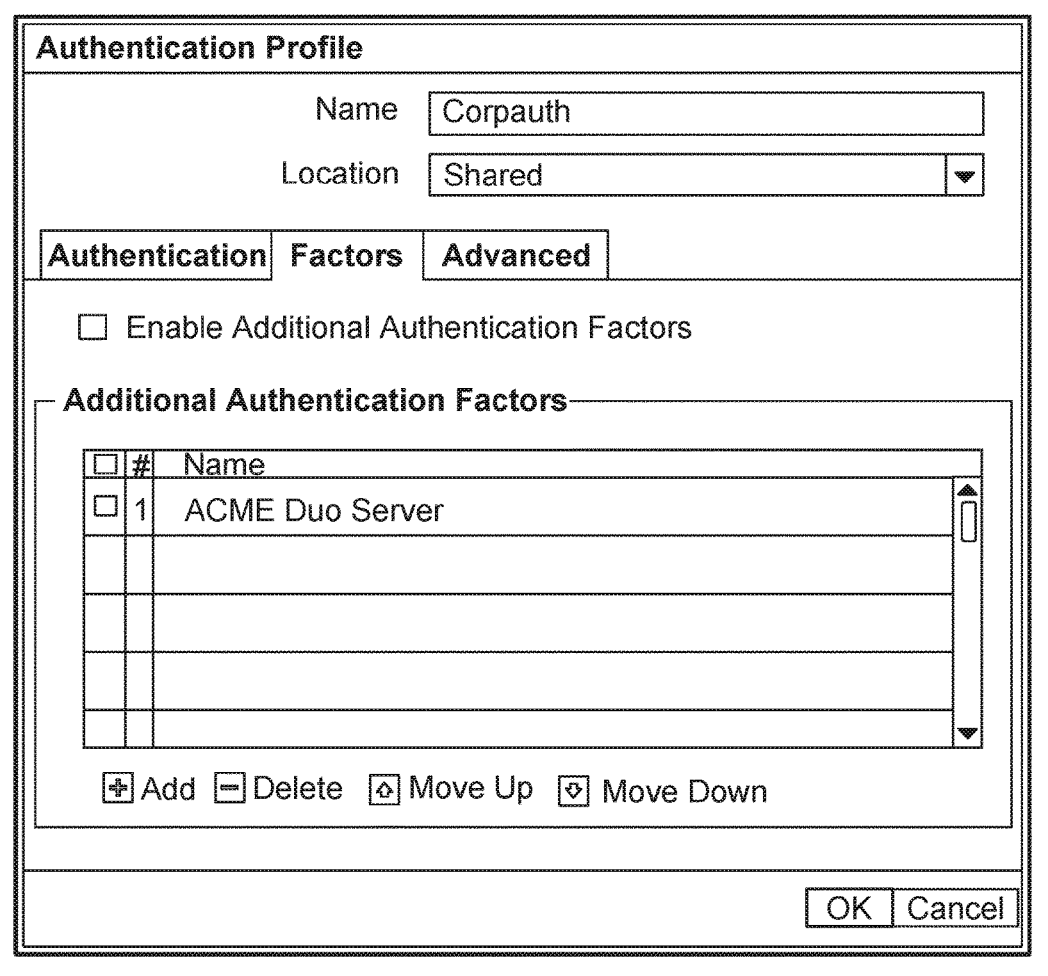

In an example implementation, an authentication profile can be configured to enable a second, third, or fourth factor of authentication as further described below. FIG. 8 illustrates an example screen shot for configuring an authentication profile in accordance with some embodiments.

As shown in FIG. 8, an administrator can enable additional authentication factors within the authentication profile. For example, this capability can be provided with a table on the Factors tab, which allows an administrator to add selected MFA server profiles to the list. Multiple factors can be enabled by checking the "Enable Additional Authentication Factors" checkbox as shown. In this example, the table also allows an administrator to select and remove a configured MFA server profile from the list. Additional authentication factors are triggered top-down, each factor being invoked will challenge the user to authenticate. When a RADIUS authentication profile is in use, the administrator is allowed to configure an empty table of additional factors when the "Enable Additional Authentication Factors" checkbox is enabled, given that MFA configuration can be integrated directly with RADIUS.

Authentication—Second/Multifactor

In one embodiment, the firewall directly integrates with any MFA vendor that can trigger and manage a challenge/ response, or an OTP authentication. For example, the firewall can integrate with various MFA vendors using their native, HTTP-based RESTful APIs (e.g., Duo Security, PingId, Okta Adaptive MFA, YubiKeys from Yubico, Symantec VIP, and/or other MFA vendors).

In one embodiment, the firewall directly integrates with MFA vendors that support RADIUS as a mechanism to trigger and manage a challenge/response, or an OTP authentication. For example, the firewall can integrate with various MFA vendors that provide such RADIUS support (e.g., Safenet, RSA SecurID, Entrust IdentityGuard, and/or other MFA vendors).

Alternative Authentication Methods via MFA

Figure 9:
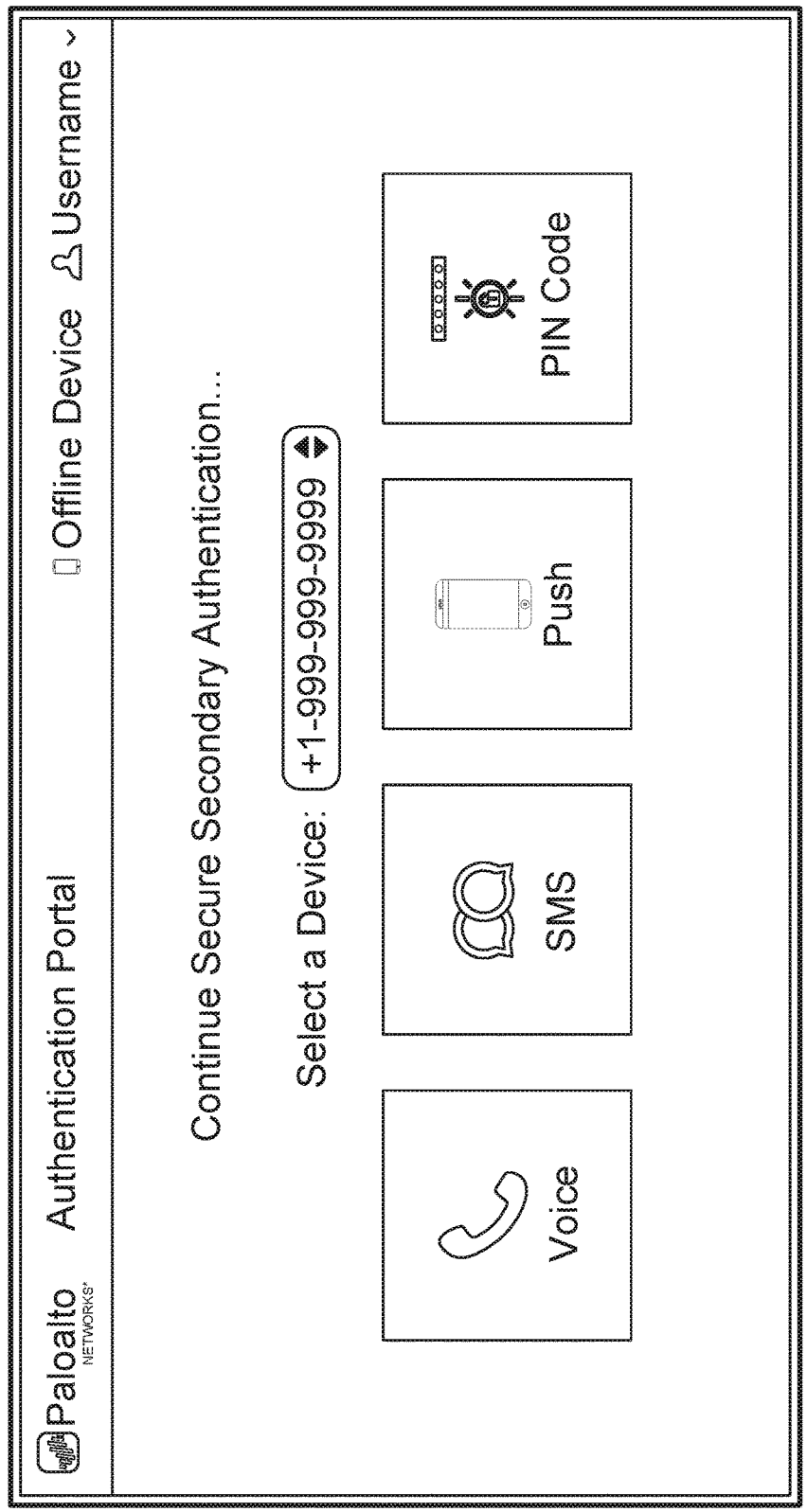
FIG. 9 is a screen diagram of an authentication portal that provides alternative authentication methods via MFA in accordance with some embodiments.

FIG. 9 is a screen diagram of an authentication portal that provides alternative authentication methods via MFA in accordance with some embodiments. For example, alternative authentication methods can be provided for authenticating via MFA if a first/primary method for that particular authentication factor is not available (e.g., offline device or other situations).

Example Authentication Policy

Figure 10:
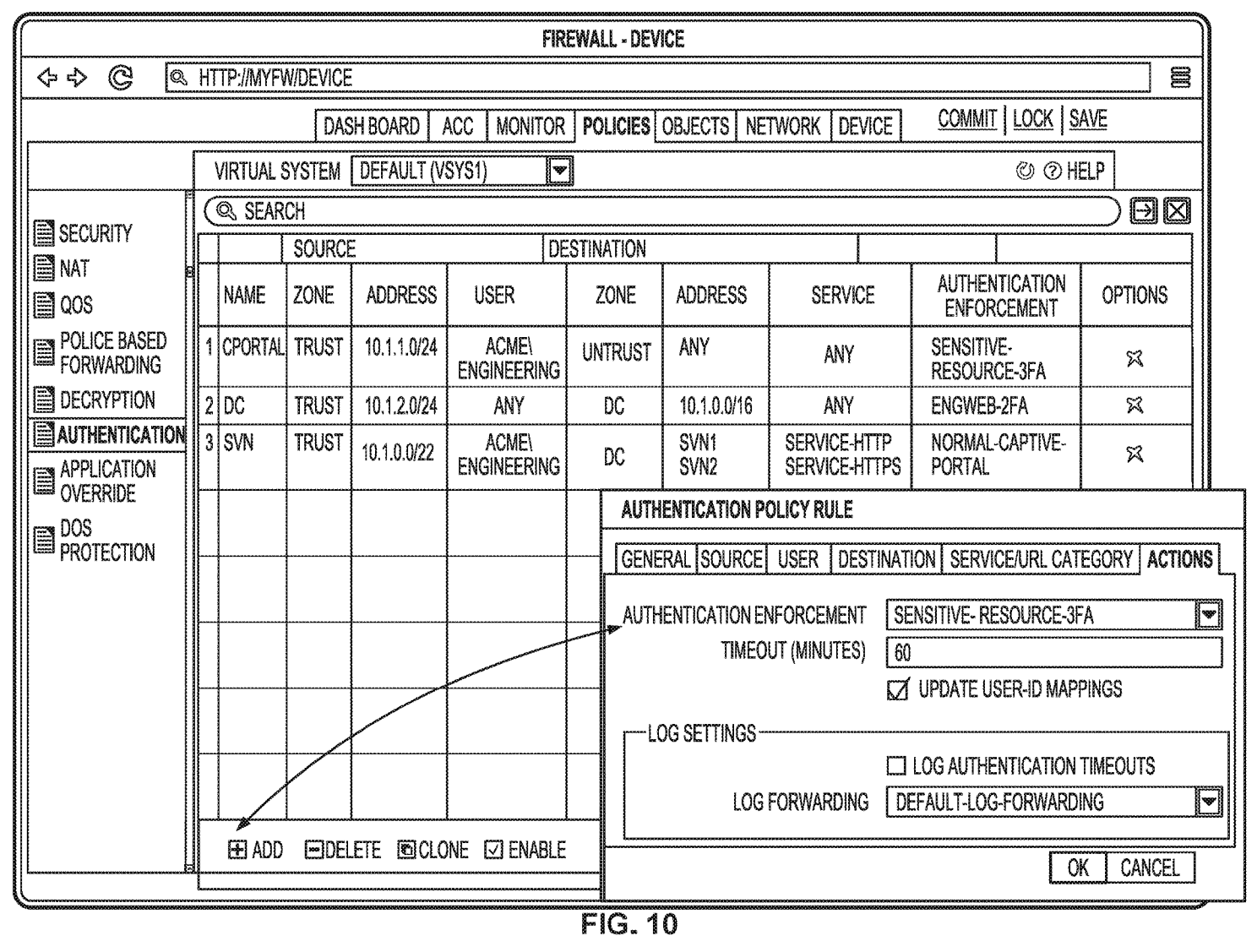

FIG. 10 is an example screen shot of an interface for configuring rules for an authentication policy for performing multifactor authentication for network services in accordance with some embodiments. In one embodiment, an authentication policy includes one or more rules. As similarly described above, authentication policy rules define the authentication criteria a user is required to satisfy/pass in order to be granted/allowed access to specific resources (e.g., destination applications or services, such as browser-based and/or non-browser based resources as similarly described above).

In one embodiment, rules of an authentication policy are processed first for each session setup to verify that the user is authenticated to the firewall sufficiently for allowing/granting access. Sessions are matched against source and destination configured in authentication portal rules. If a match is determined, then the configured action and authentication profile define what authentication is required for the session to be allowed and passed to security policy processing as similarly described above. Sessions are also matched against known source user information, such as similarly described above. If a session for a known user matches an authentication portal rule, then the firewall still enforces the authentication profile configured.

Referring to FIG. 10, an authentication policy hit/match can be based on one or more of the following match criteria (e.g., and/or additional match criteria): source zone, source address, source user and source Host Information Profile (HIP) (e.g., using GlobalProtect™ from Palo Alto Networks, Inc. or other commercially available solutions that similarly provide such HIP data for client/endpoint devices and/or API-based third-party integrations), destination zone, destination address, and service/URL category.

Figure 11:
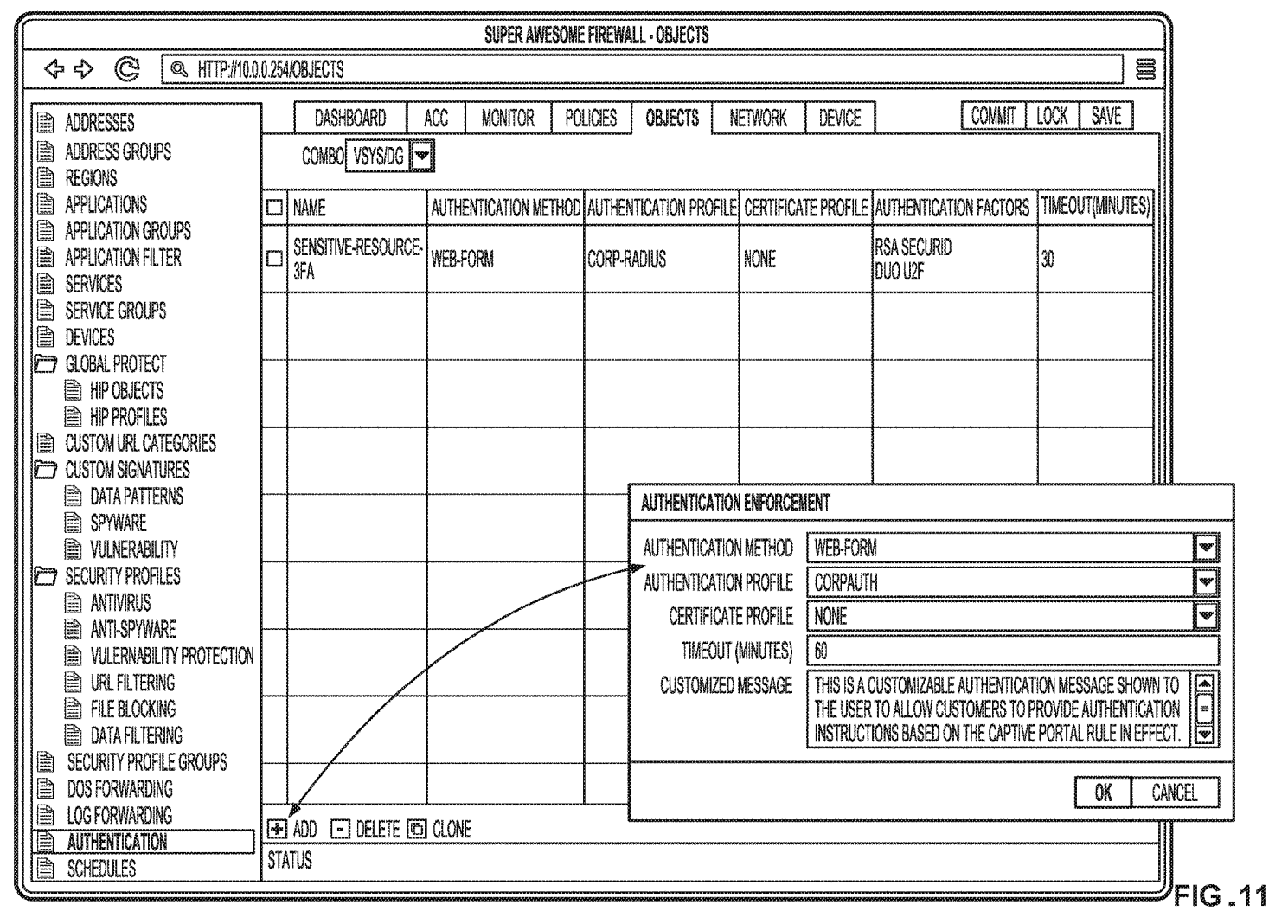

FIG. 11 is an example screen shot of an interface for configuring enforcement actions for an authentication policy for performing multifactor authentication for network services in accordance with some embodiments. As shown, the configurable actions incorporate an Authentication Enforcement object and options to selectively enable certain logging and User ID operations. The Timeout parameter (e.g., shown as a configurable parameter in minutes) serves as the TTL for this rule, when compared against the last successful 1FA and 2FA timestamps per authentication profile for this IP/user mapping in a 2FA example implementation. Log settings including log authentication timeouts can be disabled by default. If enabled, then the firewall generates an authentication log when it encounters an authentication timeout. As also shown, administrators can configure a Log Forwarding profile per rule. The Log Forwarding profile specifies downstream log forwarding actions (e.g., email, syslog, HTTP, or other forwarding mechanisms) in addition to log filtering. In this example, Update User-ID mappings is enabled by default. In this example implementation, as similarly described above, the User ID component of the firewall updates its IP/user mappings (e.g., including the User ID timeout) upon encountering a successful authentication, with information derived from this authentication transaction. In some cases, certain resources such as switches, routers, and Active Directory (AD) Domain Controllers may require an "administrator" logon, and IT may be using a predefined set of accounts. In situations like this, firewall administrators can uncheck this option, and User ID would not update/replace its IP/user mappings with the username derived from this authentication transaction.

As also shown in FIG. 11, the Authentication Enforcement object (e.g., configured under the Objects tab as shown) provides options to specify how the user needs to authenticate, and the maximum time elapsed since the user last (successfully) completed a 1FA or a 2FA/MFA authentication. Various Authentication Methods can be configured in this example, including the following: "web-form" for explicit username and password authentication; "browser-challenge" for browser challenge, such as based on NTLMv2 or Kerberos; and "no-authentication-portal" to exclude an authentication challenge and proceed to security policy evaluation. For "web-form" options, authentication portal messages displayed to the user can be overridden on a per rule basis in this example. The authentication portal message can be represented by a variable in the authentication portal response page template. The configured message will replace default message text. As a default, the following default message text can be shown: "The resource you are trying to access requires user authentication prior to access. Follow the prompts on your screen to sign on."

For example, for "web-form" for explicit username and password authentication, the firewall presents the user with an interactive web form authentication when using HTTP/HTTPS. The use of HTTP/HTTPS is determined by the service object, and by the App ID component of the firewall (e.g., a few packets later (web-browsing)). The user is authenticated using the configured authentication profile (e.g., which can include multiple factors), in which all authentication profile types can be used in authentication policy rules. In some cases, the user can be authenticated using a certificate profile. If no authentication profile is chosen, a certificate profile can be selected. In such cases, the user is transparently authenticated via the certificate profile. If both, a certificate profile as well as an authentication profile is chosen, and both authentication methods are used to authenticate the user. If a username can be extracted from the client certificate, then the username is used to prepopulate the username in the web form (e.g., which cannot be changed by the user). If no username can be extracted from a trusted client certificate presented by the user, then the user can manually enter their username in the username field of the web form.

For example, for "browser-challenge" authentication, the firewall sends an authentication challenge to the web browsers (e.g., a Kerberos V5 or NTLMv2 authentication challenge) when using HTTP/HTTPS protocols, and if authentication fails, then the firewall can fall back to "web-form" with whatever authentication profile is configured for the authentication portal. In an example implementation, for other protocols, the firewall responds with network-based message to the client (e.g., using ICMP, TCP, UDP, or another network protocol or a combination of network protocols, which can depend on the user, device, and/or the application in use), which can be processed by the client component (e.g., client component 140 of FIG. 1). The user is authenticated using the configured authentication profile (e.g., which can include multiple factors).

In an example implementation as similarly described above, the firewall updates the User ID record with two timestamps per authentication profile (e.g., in a 2FA example implementation), including the time at which the first factor of authentication was successfully completed, and the time at which the multifactor authentication was successfully completed. Authentication information on known users can be replicated between firewalls as part of the User ID replication process as also described above (e.g., including how a user authenticated, such as what authentication method, the source that was used, and the 1FA/MFA last successful authentication timestamps per authentication profile that can be replicated for both the first and the second/multiple factors).

Authentication Using a Client Component

In one embodiment, when non-browser-based resources are being accessed, the authentication policy dispatches network-based message to the client requesting access, resulting in the following sequence of events as described below. The client component (e.g., client component 140 of FIG. 1, implemented using a GlobalProtect™ agent or another client component) is capable of observing a network-based message from the firewall (e.g., as similarly described above). When such a network-based message is received, the client component displays a message that access to the requested resource was blocked, and user authentication is necessary to obtain access to the resource. As similarly described above, the client component also automatically authenticates the user with the first factor. If the client component is not aware of the user's credentials (e.g., using SAML or Kerberos), the client component displays a web page to the user, or retrieves tokens (e.g., Kerberos or other tokens) on the user's behalf. Once the first factor is completed, the client component displays a message to the end user that a subsequent authentication request has been initiated. Upon successful completion of the second factor, the client component can be configured to automatically minimize itself to the system tray.

MFA Configuration of Applications

Figure 12:
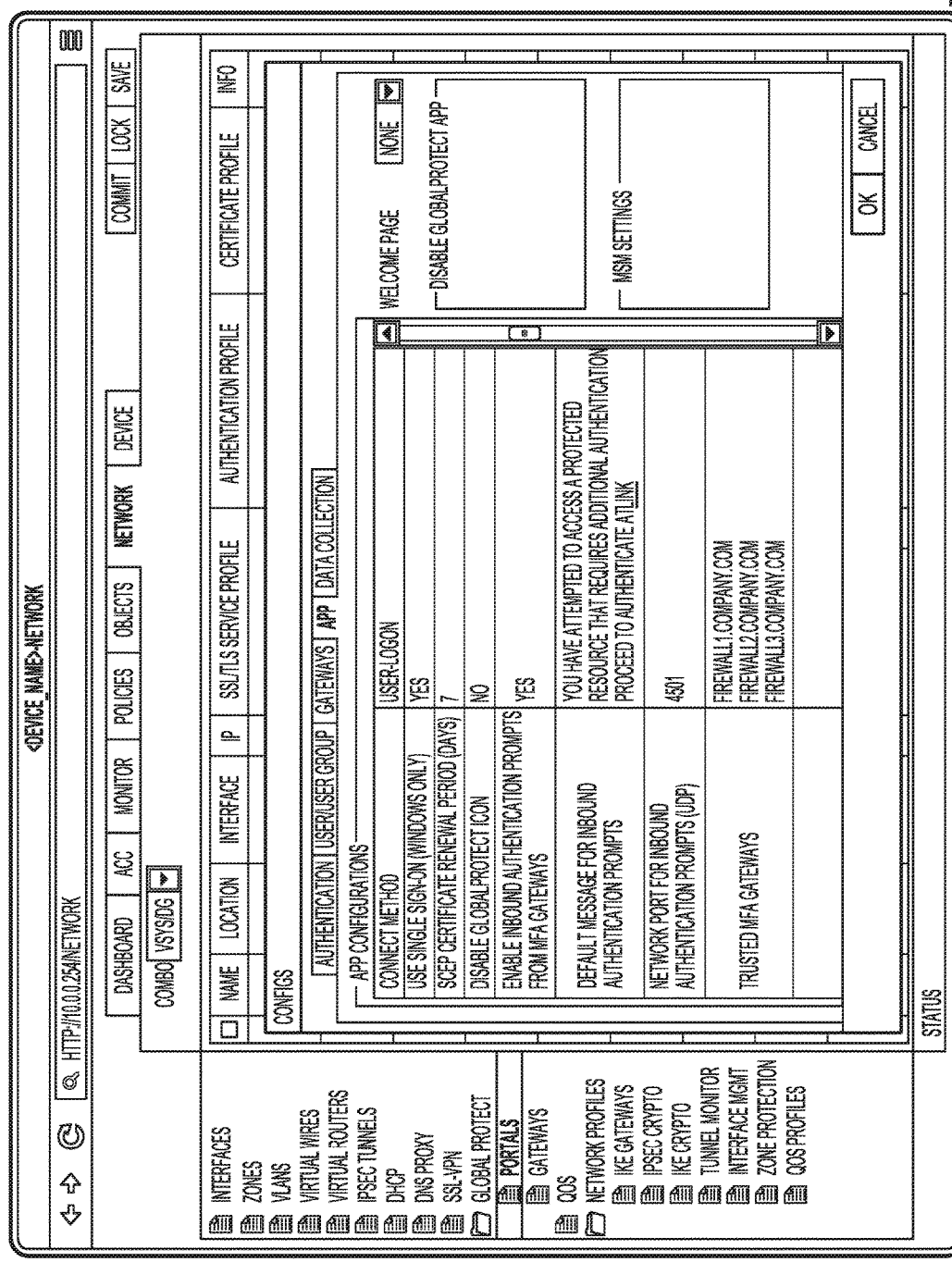
FIG. 12 is an example screen shot of an interface for configuring applications for an authentication policy for performing multifactor authentication for network services in accordance with some embodiments.

FIG. 12 is an example screen shot of an interface for configuring applications for an authentication policy for performing multifactor authentication for network services in accordance with some embodiments. As shown, the application (app) configurations include a Connect Method parameter (e.g., user-logon), a Use Single Sign-On parameter (e.g., yes or no), SCEP Certificate Renewal Period (days) parameter, a Disable GlobalProtect™ Icon (e.g., yes, or no), Enable Inbound Authentication Prompts from MFA Gateways (e.g., yes or no), Default Message for Inbound Authentication Prompts that can be configured, Network Port for Inbound Authentication Prompts (UDP) parameter, and Trusted MFA Gateways that can be configured.

MFA Monitoring and Logging for Automated Security Detection

Figure 13:
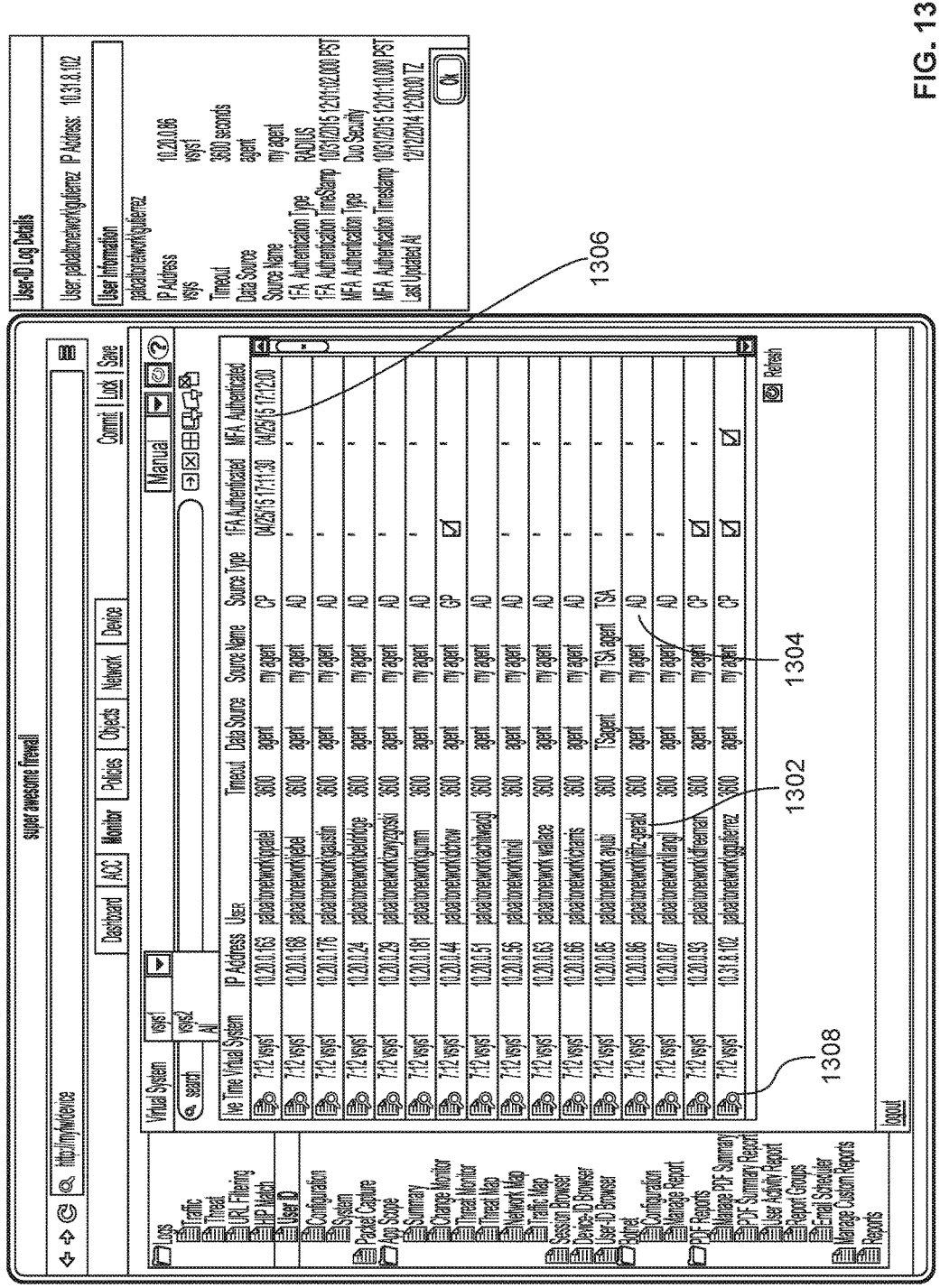
FIG. 13 is an example screen shot of an interface for monitoring enforcement of an authentication policy for performing multifactor authentication for network services in accordance with some embodiments
Figure 14:
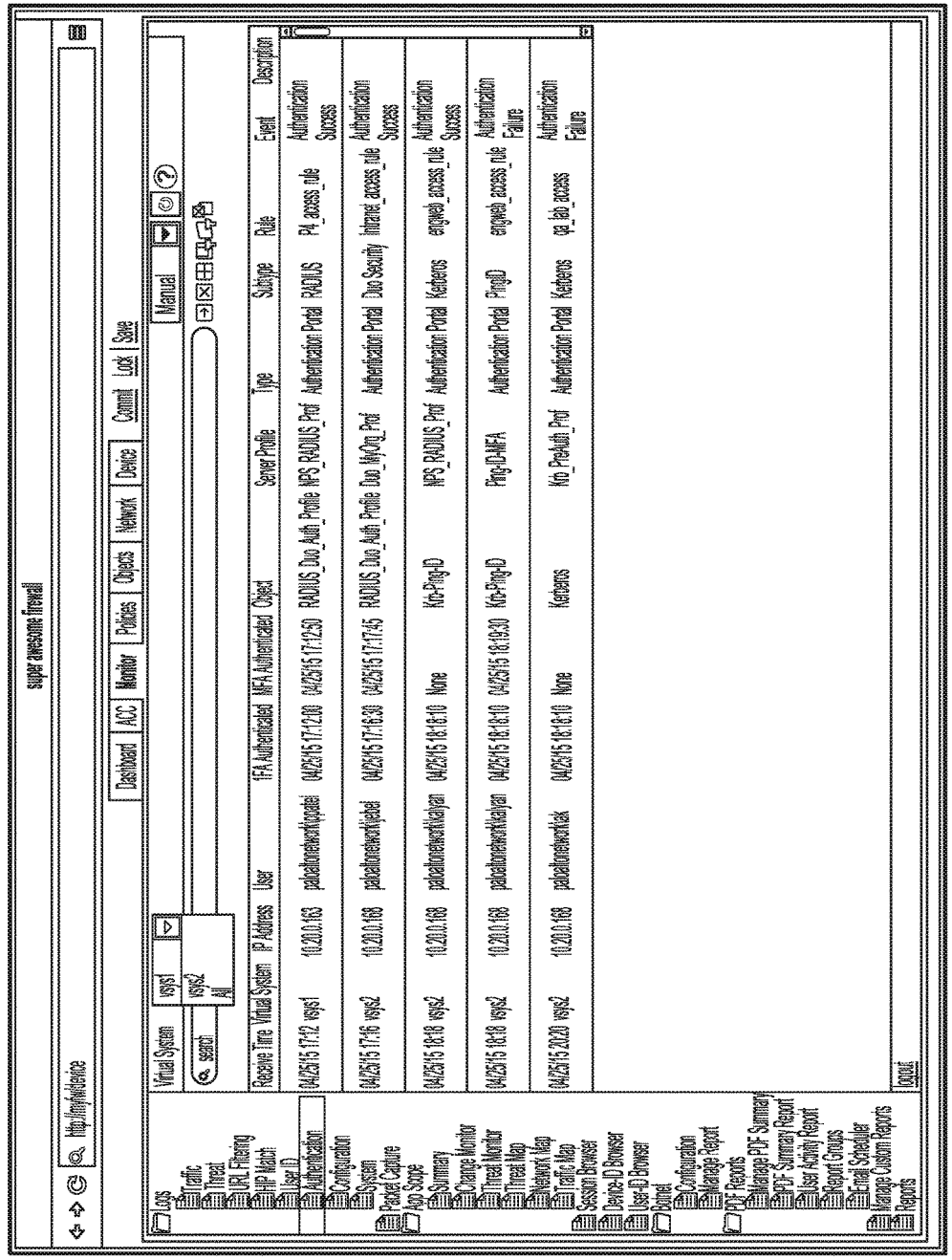
FIG. 14 is an example screen shot of an interface for a log viewer for performing multifactor authentication for network services in accordance with some embodiments.

In one embodiment, a firewall that implements the disclosed WA techniques as described above provides a view into an authentication and User ID log (e.g., an authentication and User ID log database or other data format). For example, the authentication and User ID log captures forensic trails for all established IP/user mappings over time. As shown in FIGS. 13 and 14 as further described below, an interface of the firewall provides access to the information captured in the authentication and User ID log via a User-ID Log menu item under the Logs menu of the Monitor tab.

Authentication and User ID Log Viewer

FIG. 13 is an example screen shot of an interface for monitoring enforcement of an authentication policy for performing multifactor authentication for network services in accordance with some embodiments. In one embodiment, a Monitor tab of an interface of a firewall that implements the disclosed MFA techniques as described above displays various monitored WA/authentication information.

Referring to FIG. 13, a user (e.g., user name) and associated IP address are displayed. For example, an admin can filter based on a selected IP address. Also, an admin can filter based on a selected user name as shown at 1302 or based on a selected source type or source name as shown at 1304. As shown at 1306, the Monitor screen displays 1FA and MFA status where observed for each monitored user (e.g., IP address and associated user). As shown at 1308, another window showing User-ID Log Details is displayed. For example, an admin can trigger the display of the User-ID Log Details for a selected user/IP address (e.g., admins can view user and device details by clicking a details/magnifying glass icon attached to each record).

As shown in FIG. 13, an interface (e.g., GUI and/or CLI) of the firewall displays a paged list of one or more (or all) entries in the User-ID log database with the following example columns displayed by default: Receive Time, Virtual System, IP Address (e.g., IPv4 and IPv6 addresses), Username, Timeout, Data Source, Source Name, and Source Type. For example, the interface of the firewall can also display various other monitored information (e.g., not displayed by default in this example as shown in FIG. 13), such as the following: Event Type (e.g., logon, logoff); Begin Port (e.g., User-ID for a terminal services session); End Port (e.g., User-ID for a terminal services session); Direction; Query; List of Authentication Profiles the user has authenticated to; 1FA Timestamp for this authentication profile; and 2FA Timestamp for this authentication profile (e.g., or latter factors for MFA).

In this example, as similarly described above with respect to FIG. 13, a User ID browser of the interface of the firewall also allows administrators to filter the view by all columns available on the UI search criteria (e.g., and permits filters based on the data type of the filtered column): Date/time operators, IP address operators (e.g., including subnet blocks and IP address ranges), String operators, Integer operators, and/or Username operators (e.g., including string matches and user-group matches). Logs can be exported from the interface to generate log reports (e.g., CSV records or other data formats) via the GUI, CLI, and/or API interfaces of the firewall.

Authentication Logging and Correlation for Identification of Compromised Credentials FIG. 14 is an example screen shot of an interface for a log viewer for performing multifactor authentication for network services in accordance with some embodiments. In one embodiment, a firewall that implements the disclosed WA techniques as described above displays various monitored WA/authentication information and generates authentication logs for monitored authentication activities of users (e.g., a log type for the firewall referred to as an "authentication log" type). For example, authentication attempts monitored by a firewall of the enterprise logs such authentication attempts activity to the authentication log type (e.g., which can be shared across firewalls of an enterprise or other management layers for monitoring firewall/network activities across an enterprise network, such as using Panorama from Palo Alto Networks, Inc. or other management solutions via Simple Network Management Protocol (SNMP) (including generating SNMP traps for authentication log events) or via other standard or proprietary protocols).

In an example implementation, as shown in FIG. 14, fields of the authentication log include the following: Username, IP Address, First Factor Authentication Time (e.g., for initial authentication attempts, irrespective of the presence of additional authentication factors), Additional Factors Authentication Time (e.g., logs the last successful authentication timestamp for the last configured additional authentication factor), Object (e.g., Authentication Profile/Certificate Profile), Type (e.g., indicates the component that invoked user authentication), Subtype, Rule (e.g., for authentication policy hits), Event (e.g., event types such as Success, Failure, and/or Timeout), ServerProfile (e.g., name), and Description (e.g., a field that can be used to provide details as returned by the MFA vendor or the firewall if the firewall is capable of performing MFA functionality similar to third party MFA vendors).

In this example, authentication logs are generated for one or more of the following events: successful MFA log event (e.g., one per factor), failed MFA log event (e.g., one per factor), and authentication timeouts (e.g., one per factor). As similarly described above with respect to the User ID log, admins can similarly filter and generate reports for the authentication log.

Correlating Authentication Log and System Log Events for Identifying Compromised Credentials and/or Compromised Endpoints In one embodiment, a firewall that implements the disclosed MFA techniques including logging of authentication events as described above performs correlating multiple authentication log and system log events to automatically identify compromised credentials and endpoints that are requesting access using these compromised credentials. For example, to generate these correlation events, the firewall monitors authentication and system logs for patterns that are used to identify activities associated with compromised credentials.

Example authentication and system logs patterns that can be monitored to generate correlation events will now be described.

As a first example authentication and system logs pattern, for a given user account, 1FA succeeds, and 2FA/MFA fails consistently from a single endpoint (e.g., the firewall can identify/alert based on a threshold number of authentication failure events that this user's credentials have been compromised).

As a second example authentication and system logs pattern, for a given user account, 1FA succeeds, and 2FA/MFA times out consistently from a single endpoint (e.g., the firewall can identify/alert based on a threshold number of authentication timeout events that this user's credentials have been potentially compromised or this endpoint has been potentially compromised such as having malware executing on the endpoint that is attempting to access other resources on the enterprise network but is failing to authenticate on additional authentication factors, in which various techniques can be performed to heuristically identify compromised credentials and/or compromised endpoints (e.g., malware kit on endpoint, such as a network scanner, bot, or Advanced Persistent Threat (APT) malware)).

As a third example authentication and system logs pattern, for a given account, 1FA succeeds, and 2FA/MFA fails consistently from multiple endpoints (e.g., the firewall can identify/alert based on a threshold number of authentication failure events from multiple endpoints as an indication of compromised credentials that an unauthorized user is attempting to reuse from the multiple endpoints but is failing to authenticate on additional authentication factors).

As a fourth example authentication and system logs pattern, for a given account, 1FA succeeds, and 2FA/MFA times out consistently from multiple endpoints (e.g., the firewall can identify/alert based on a threshold number of authentication timeout events from multiple endpoints as an indication of compromised credentials that an unauthorized user is attempting to reuse from the multiple endpoints but is failing to authenticate on additional authentication factors).

As a fifth example authentication and system logs pattern, for a given user account, 1FA times out consistently from a single endpoint (e.g., the firewall can identify/alert based on a threshold number of authentication failure events that this endpoint has been compromised, such as being infected with malware executing on the endpoint that is attempting to access other resources on the enterprise network but is failing to authenticate on the first authentication factor).

As a sixth example authentication and system logs pattern, for a given user account, 1FA times out consistently from multiple endpoints (e.g., the firewall can identify/alert based on a threshold number of authentication failure events that the multiple endpoints have been compromised, such as being infected with malware, such as a network scanner, executing on these endpoints that is attempting to access other resources on the enterprise network but is failing to authenticate on the first authentication factor).

As a seventh example authentication and system logs pattern, a single endpoint (source) attempts to authenticate as multiple users which succeeds at 1FA, but fails or encounters a timeout for 2FA/MFA (e.g., the firewall can identify/alert based on a threshold number of timeout failure events that multiple credentials for enterprise users have been compromised and an unauthorized user is attempting a targeted attack on the enterprise to compromise one or more other resources on the enterprise network and that this endpoint is also compromised by the targeted attack, in which the unauthorized user/malware is attempting to access other resources on the enterprise network using 1FA credentials for multiple different users but is failing to authenticate on additional authentication factors).

In an example implementation, the firewall can log warnings, generate alerts, and/or perform other responsive actions based on monitored authentication related events, such as based on a number of failed or timed-out authentication attempts (e.g., for first or latter factors). For example, if a first threshold number of authentication attempts fail (e.g., three or some other threshold number, in which such thresholds are configurable), then the firewall logs a warning. If a second threshold number of authentication attempts fail (e.g., five or some other threshold number), then the firewall can log a higher level warning. If a third threshold number of authentication attempts fail (e.g., ten or some other threshold number), then the firewall can generate an alert and/or perform some other responsive action(s) (e.g., block/reset the compromised credentials and/or quarantine the compromised endpoint device).

As another example, the firewall can log warnings, generate alerts, and/or perform other responsive actions based on monitored authentication related events, such as based on failed or timed-out authentication attempts to certain resources (e.g., highly confidential/sensitive destinations, such as financial data or a source code repository).

As yet another example, the firewall can log warnings, generate alerts, and/or perform other responsive actions based on monitored authentication related events, such as if certain endpoint(s) are detected to be compromised (e.g., executive endpoint(s) or VLAN(s)). If an endpoint is deemed to be compromised or suspicious as potentially compromised, then the firewall can tag the endpoint as a quarantine endpoint, and then the authentication policy can restrict access from that quarantine endpoint so that the endpoint cannot access other resources on the enterprise network using a dynamic policy enabled by the above-described techniques. In one embodiment, in addition to the authentication policy, the "tag" manifests itself in other areas such as the security policy. For example, the security policy can treat such a "quarantined" endpoint in a different manner when compared to an ordinary endpoint, and can restrict/deny access to sensitive resources or perform additional tasks such as enhanced/in-depth content scanning that is not enabled or may not performed for other non-tagged, ordinary endpoints.

As will now be apparent, additional authentication and system logs patterns can be monitored to facilitate performing the disclosed techniques for correlating multiple authentication log and system log events to automatically identify compromised credentials, and endpoints that are requesting access using the compromised credentials.

High Availability

In one embodiment, both the 1FA "last authentication timestamp" and the 2FA/MFA "last authentication timestamp" recorded per authentication profile are High Availability (HA)-synced along with the rest of the User ID state information between firewalls on an enterprise network, such as similarly described above.

Virtual Systems

In one embodiment, an authentication policy rule base is configurable on a per-vsys basis (e.g., vsys generally refers to a logically separated set of firewalls that exist within a given physical firewall). For example, MFA server profiles can be configurable on a per-vsys basis or exist in the shared context.

Example Components of a Firewall for Performing Multifactor Authentication as a Network Service As similarly described above, various improved techniques for performing multifactor authentication as a network service are disclosed.

Figure 15:
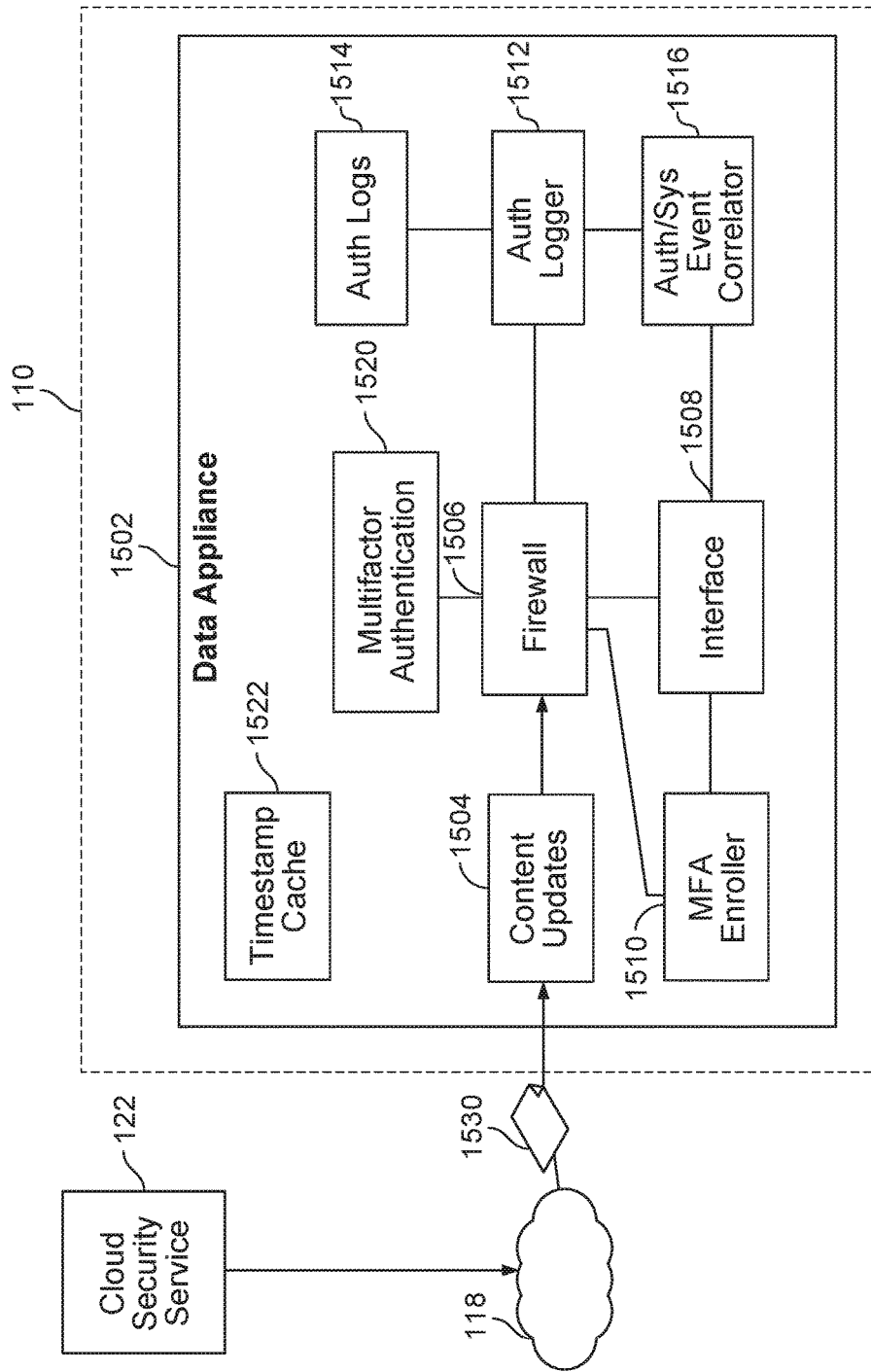
FIG. 15 is a component diagram of a data appliance for performing multifactor authentication as a network service in accordance with some embodiments.

FIG. 15 is a component diagram of a data appliance for performing multifactor authentication as a network service in accordance with some embodiments. In an example implementation, data appliance 102 of FIGS. 1-3 can be implemented using the components of data appliance 1502 as shown in FIG. 15 as further described below. In another example implementation, cloud security service 122 of FIG. 1 can be implemented using the components of data appliance 1502 as shown in FIG. 15 (e.g., using the cloud security service to provide the functions of data appliance 1502) as further described below.

Referring to FIG. 15, a data appliance 1502 of enterprise network 110 receives content updates 1530 (e.g., and can similarly receive operating system (OS) or other software updates) via Internet 118. For example, content updates can include authentication related content updates, such as configuration and logic for integration with and support of one or more MFA vendors or for updates related to such MFA vendors. As another example, content updates can include other security related updates, such as signature updates for detection of malware (e.g., file-based signatures for malware, malware URLs, intrusion detection/network related signatures, etc.). As similarly described above, content updates can by implemented using the disclosed techniques for dynamic content updates. Content updates 1530 are stored at 1504 and provided to a firewall 1506 for processing.

In one embodiment, firewall 1506 performs firewall functionality including providing authentication as a network service as similarly described above (e.g., with respect to FIGS. 1-3 and other embodiments described herein). An interface component 1508 for the firewall provides an interface (e.g., a UI/GUI, CLI, and/or API-based interface) for configuring and accessing information monitored and generated by firewall 1506 as similarly described herein.

In one embodiment, data appliance 1502 includes an MFA enroller 1510. For example, MFA enroller component 1510 can perform MFA enrollment of users as similarly described herein. In an example implementation, MFA client enrollment/registration can be implemented using a redirect (HTTP 302) to an enrollment/registration portal (e.g., which can call back hosts), or the firewall can natively support such MFA client enrollment/registration (e.g., using MFA enroller component 1510).

As also shown in FIG. 15, data appliance 1502 includes an auth logger 1512 for performing logging of authentication events monitored by firewall 1506 as similarly described herein. The logged authentication events monitored by firewall 1506 are stored in auth logs 1514 (e.g., a logging database, which can include logged data related to authentication events, User ID, security events, system events, and/or other logged events/data monitored/captured by firewall 1506).

As also shown, data appliance 1502 includes a multifactor authenticator component 1520 for providing multifactor authentication. In one embodiment, data appliance 1502 supports both natively implemented MFA and also supports integration with third party MFA vendors for performing MFA using the firewall. For example, multifactor authenticator 1520 can integrate with third party MFA vendor solutions (e.g., via APIs and/or via RADIUS or other integration mechanisms), such as similarly described above. In one embodiment, multifactor authenticator 1520 can also natively perform MFA using the firewall, such as similarly described above.

As also shown in FIG. 15, data appliance 1502 includes a timestamp cache 1522 for storing timestamps utilized, for example, in the disclosed techniques for performing time-based authentication challenges. In an example implementation, timestamps can be stored locally in a table associated with the User ID (e.g., for session, IP source, IP destination, etc.) in a data plane of the firewall implemented by data appliance 1502 and can be synchronized/shared across different data appliances/firewalls and/or can be implemented using cloud-based solutions, such as similarly described above.

Whenever data appliance 1502 is described as performing a task, a single component, a subset of components or all components of data appliance 1502 may cooperate to perform the task. Similarly, whenever a component of data appliance 1502 is described as performing a task, a subcomponent may perform the task and/or the component may perform the task in conjunction with other components. Similarly, additional logical components/features can be added to data appliance 102 as applicable.

Additional example processes for the disclosed techniques for performing multifactor authentication as a network service will now be described.

Processes for Performing Multifactor Authentication as a Network Service

Figure 16:
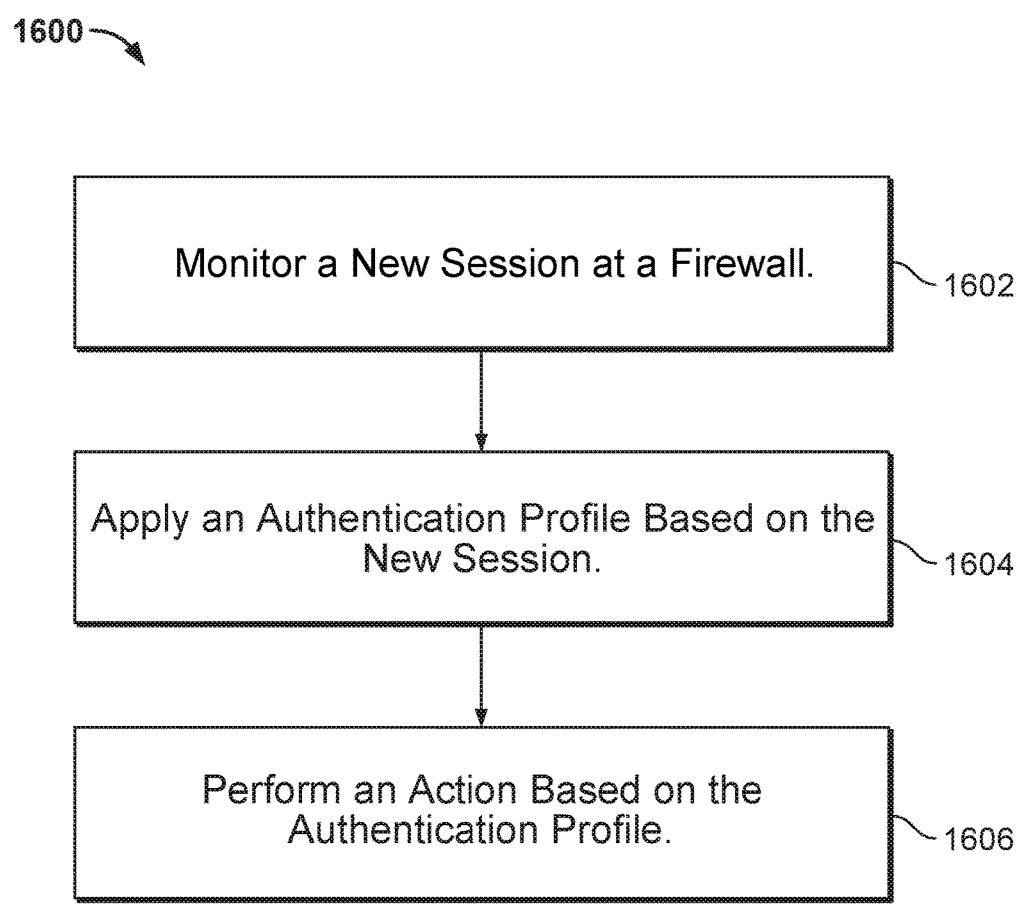
FIG. 16 is a flow diagram of a process for performing multifactor authentication as a network service in accordance with some embodiments.

FIG. 16 is a flow diagram of a process for performing multifactor authentication as a network service in accordance with some embodiments. In some embodiments, a process 1600 as shown in FIG. 16 is performed by the platform and techniques as similarly described above including the embodiments described above with respect to FIGS. 1-15. In one embodiment, process 1600 is performed by data appliance 102 as described above with respect to FIGS. 1-3 and/or data appliance 1502 as described above with respect to FIG. 15. In one embodiment, process 1600 is performed by cloud security service 122 as described above with respect to FIGS. 1, 3, and 15.

The process begins at 1602 when a firewall intercepts a new session and performs monitoring of the new session at the firewall. For example, the firewall can monitor new and/or existing sessions to intercept requests for access to a resource (e.g., another device, server, application, web site/service, etc.), such as similarly described above with respect to FIGS. 1 and 3.

At 1604, applying an authentication profile based on the new session is performed. For example, the firewall can select the authentication profile (e.g., a multifactor authentication profile) based on a match of criteria associated with the new session at the firewall (e.g., source zone and IP address, source user or group, destination zone and IP address, and service and URL category) as similarly described above.

In an example implementation, as similarly described above, one or more rules of an authentication policy specify criteria a user (e.g., a user associated with a new session) is to satisfy prior to getting access to a specific destination(s)/resource(s). The rules are processed first for every session setup to verify that the user is authenticated to the firewall sufficiently for getting access to the specific destination(s)/resource(s). Sessions are matched against criteria associated with the new session at the firewall (e.g., source zone and IP address, source user or group, destination zone and IP address, service and URL category, Host Information Profile (HIP), and/or other criteria as similarly described above). If a match occurs, the configured action and authentication profile (e.g., a multifactor authentication profile configured for enforcement in the authentication policy for the matching rule) specify what authentication is to be performed for this session to be allowed access to the specific destination(s)/resource(s) and can then be passed to security policy processing for additional security related processing to be performed by the firewall as also similarly described above.

At 1606, performing an action based on the authentication profile is performed (e.g., using firewall 1506 and multifactor authenticator 1520 as shown in FIG. 15). For example, the firewall can block or drop the session if one or more authentication factors fail or time-out, in which the one or more authentication factors are required based on the authentication profile, such as similarly described above. As another example, the firewall can allow the session to access a requested resource if each authentication factor required by the authentication profile is satisfied, such as similarly described above.

Figure 17:
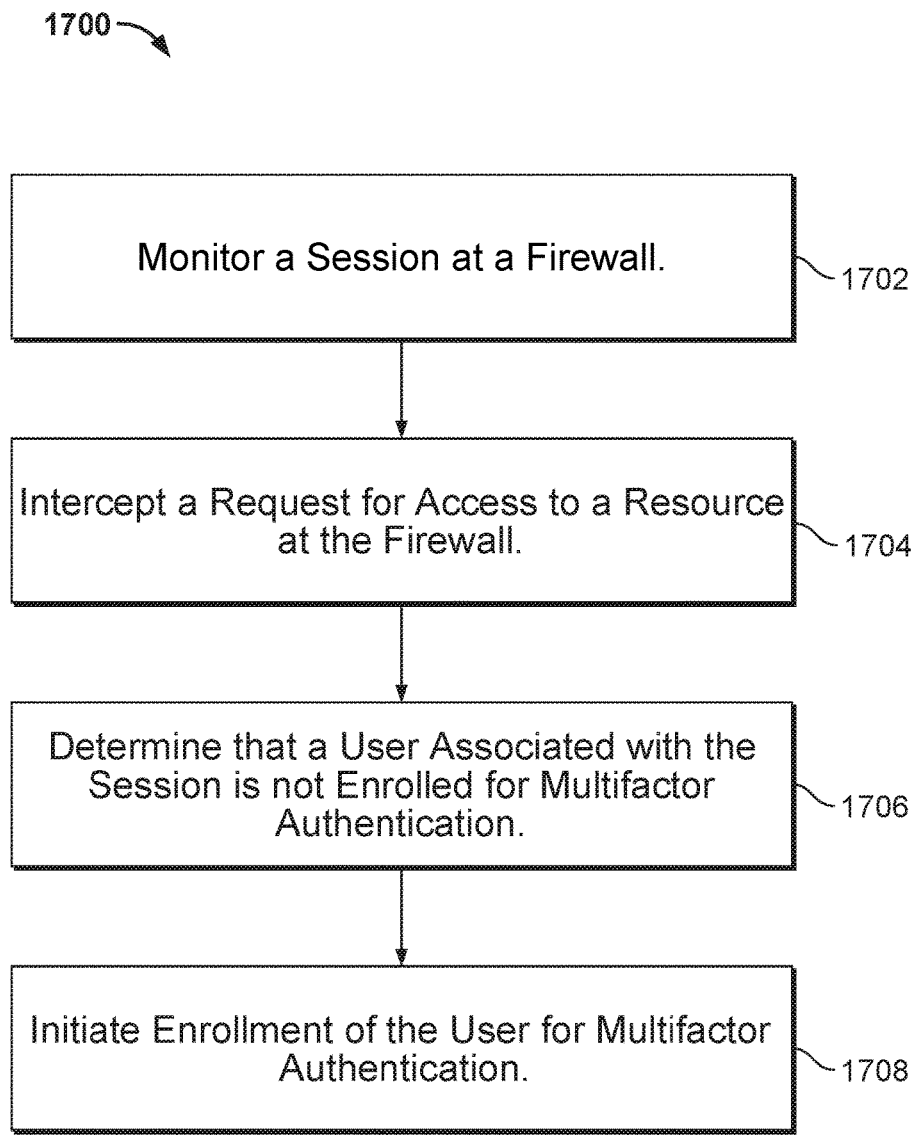
FIG. 17 is a flow diagram of a process for performing intercept-based multifactor authentication enrollment of clients as a network service in accordance with some embodiments.

Processes for Performing Intercept-Based Multifactor Authentication Enrollment of Clients as a Network Service FIG. 17 is a flow diagram of a process for performing intercept-based multifactor authentication enrollment of clients as a network service in accordance with some embodiments. In some embodiments, a process 1700 as shown in FIG. 17 is performed by the platform and techniques as similarly described above including the embodiments described above with respect to FIGS. 1-15. In one embodiment, process 1700 is performed by data appliance 102 as described above with respect to FIGS. 1-3 and/or data appliance 1502 as described above with respect to FIG. 15. In one embodiment, process 1700 is performed by cloud security service 122 as described above with respect to FIGS. 1, 3, and 15.

The process begins at 1702 when a firewall performs monitoring of the new session at the firewall and intercepts a request for access to a resource while monitoring the session at the firewall at 1704. For example, the firewall can monitor new and/or existing sessions to intercept requests for access to a resource (e.g., another device, server, application, web site/service, etc.), such as similarly described above with respect to FIGS. 1 and 3.

At 1706, the firewall determines that a user associated with the session is not enrolled for multifactor authentication. For example, the resource can be associated with an authentication profile for multifactor authentication (e.g., enforced by the firewall), which specifies that users must enroll for the multifactor authentication and satisfy configured multifactor authentication requirements in order to access the resource as similarly described above.

At 1708, the firewall initiates enrollment of the user for the multifactor authentication. For example, the firewall can complete enrollment of the user for the multifactor authentication (e.g., using MFA enroller 1510 as shown in FIG. 15) and allow access to the resource after completing enrollment of the user for the multifactor authentication, such as similarly described above. As another example, as similarly described above, a configurable grace period can be specified for different resources (e.g., more sensitive resources may have no grace period or a shorter grace period). For example, the firewall can allow access to the resource prior to completing enrollment of the user for the multifactor authentication, in which the user is allowed access to the resource for a predetermined period of time prior to being required to complete enrollment of the user for the multifactor authentication (e.g., for a configured (grace) period of time, such as based on an authentication profile). As yet another example, the firewall can block access to the resource prior to completing enrollment of the user for the multifactor authentication (e.g., there is no grace period or the user has exceeded the configured grace period for completing their MFA enrollment to access the requested resource), such as similarly described above.

Processes for Performing Detection of Compromised Credentials on a Network

Figure 18:
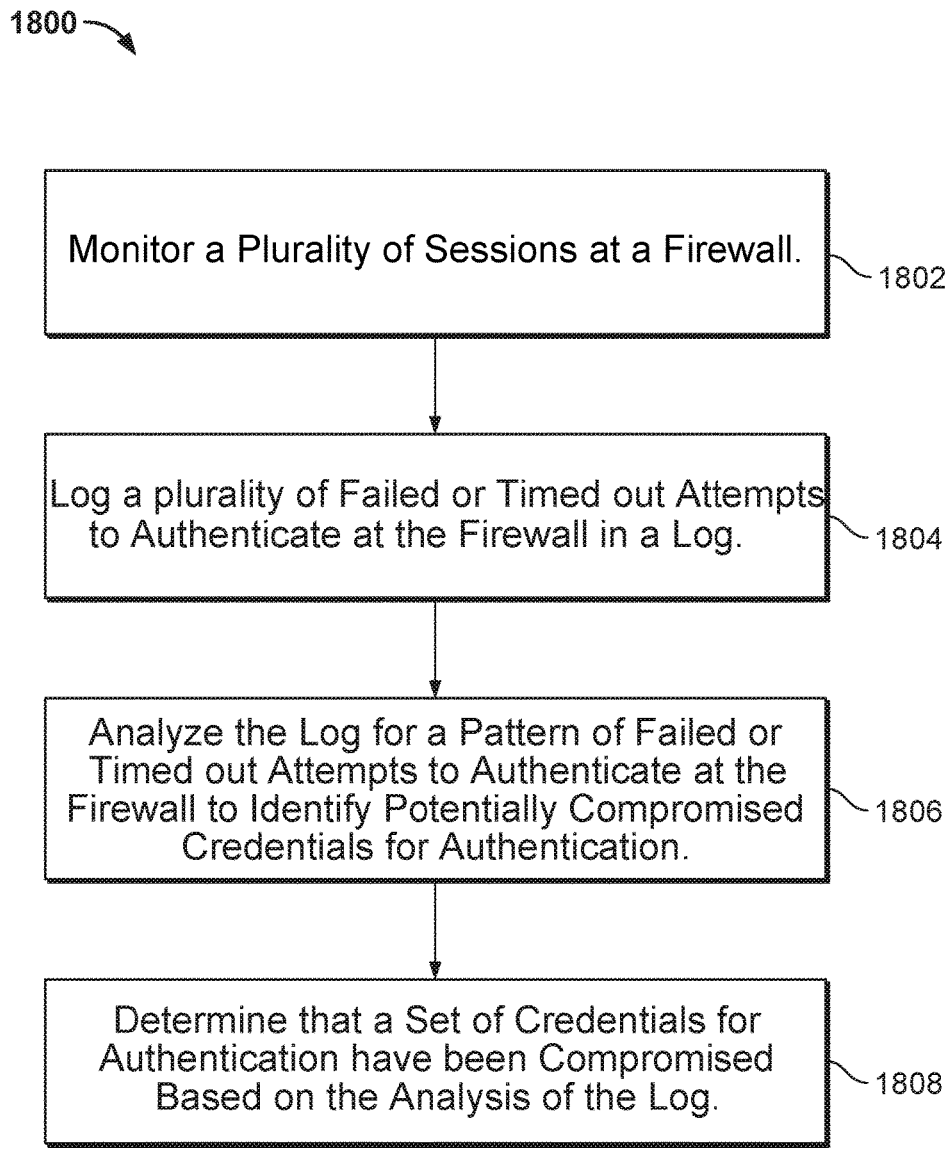
FIG. 18 is a flow diagram of a process for performing detection of compromised credentials on a network in accordance with some embodiments.

FIG. 18 is a flow diagram of a process for performing detection of compromised credentials on a network in accordance with some embodiments. In some embodiments, a process 1800 as shown in FIG. 18 is performed by the platform and techniques as similarly described above including the embodiments described above with respect to FIGS. 1-15. In one embodiment, process 1800 is performed by data appliance 102 as described above with respect to FIGS. 1-3 and/or data appliance 1502 as described above with respect to FIG. 15. In one embodiment, process 1800 is performed by cloud security service 122 as described above with respect to FIGS. 1, 3, and 15.

At 1802, a firewall performs monitoring of a plurality of sessions at the firewall. For example, the firewall can monitor new and/or existing sessions to intercept requests for access to a resource (e.g., another device, server, application, web site/service, etc.), such as similarly described above with respect to FIGS. 1 and 3.

At 1804, a plurality of failed or timed out attempts to authenticate at the firewall are logged in a log. For example, the firewall can log various authentication related events, including failed and timed out attempts for MFA to an authentication log, such as similarly described above.

At 1806, an analysis of the log for a pattern of failed or timed out attempts to authenticate at the firewall to identify potentially compromised credentials for authentication is performed. For example, various patterns of MFA related events can be analyzed to detect potentially compromised credentials (e.g., or compromised endpoints) based on a correlation of objects, such as similarly described above.

At 1808, a set of credentials for authentication is determined to have been compromised based on the analysis of the log. For example, the firewall can automatically detect compromised credentials (e.g., and/or compromised endpoints) based on the analysis of the log and based on configurable thresholds based on counts of events (e.g., using auth/sys event correlator 1516 as shown in FIG. 15 and authentication logs 1514 as shown in FIG. 15 that provide an audit trail of attempts to access various resources associated with an authentication policy as similarly described above) and perform a responsive action. If a user's credentials have been compromised, then the firewall can block and/or reset the user's credentials. If an endpoint has been compromised, then the resource can notify a user of the endpoint and/or quarantine the endpoint.

Processes for Performing Time-Based Network Authentication Challenges

Figure 19:
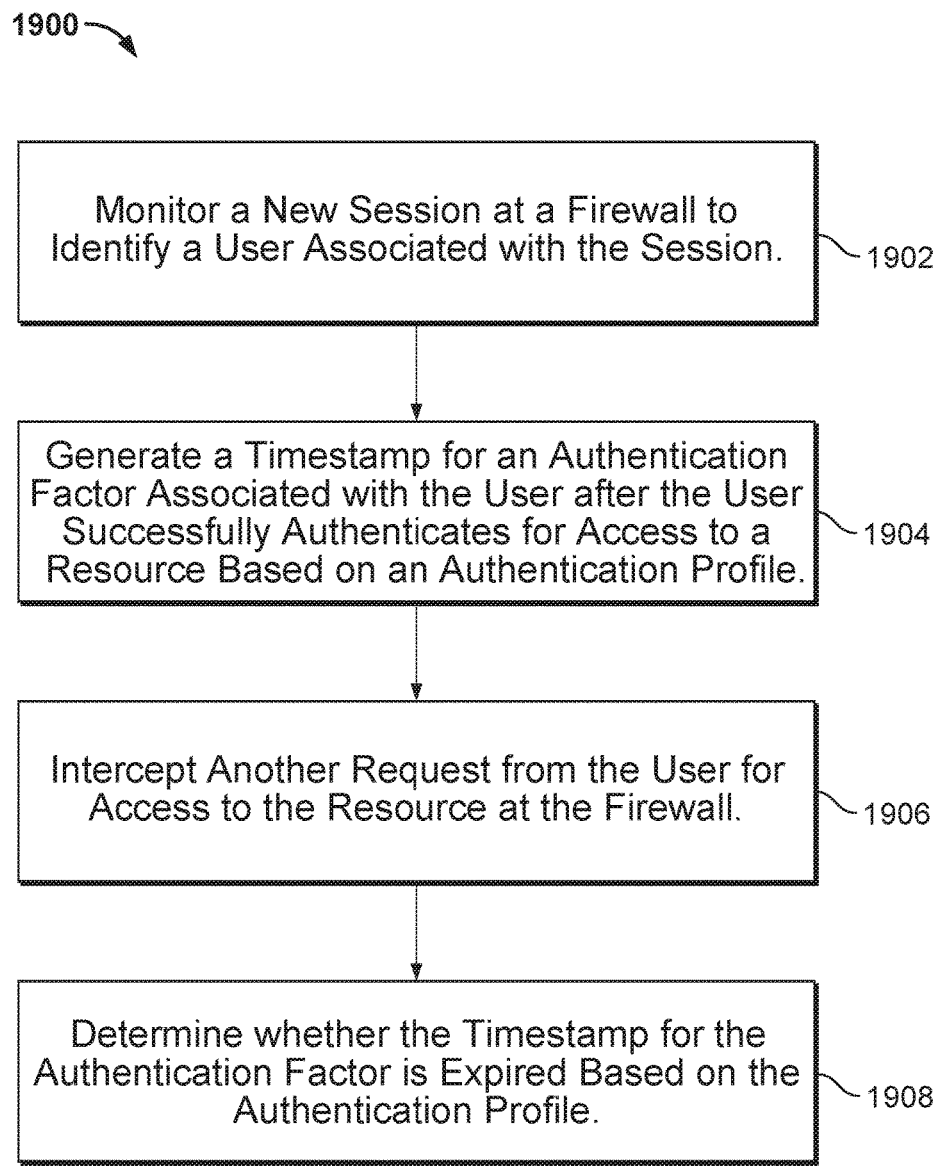
FIG. 19 is a flow diagram of a process for performing time-based network authentication challenges in accordance with some embodiments.

FIG. 19 is a flow diagram of a process for performing time-based network authentication challenges in accordance with some embodiments. In some embodiments, a process 1900 as shown in FIG. 19 is performed by the platform and techniques as similarly described above including the embodiments described above with respect to FIGS. 1-15. In one embodiment, process 1900 is performed by data appliance 102 as described above with respect to FIGS. 1-3 and/or data appliance 1502 as described above with respect to FIG. 15. In one embodiment, process 1900 is performed by cloud security service 122 as described above with respect to FIGS. 1, 3, and 15.

The process begins at 1902 when a firewall performs monitoring of a new session at the firewall and identifies a user associated with the session. For example, the firewall can monitor new sessions and identify users (e.g., user name and IP address) associated with the session, such as similarly described above with respect to FIGS. 1 and 3.

At 1904, the firewall generates a timestamp for an authentication factor associated with the user after the user successfully authenticates for access to a resource based on an authentication profile. For example, for MFA requirements for access to the resource, a timestamp can be generated for each of the authentication factors (e.g., 1FA Timestamp, 2FA Timestamp, etc.) that are associated with the user, such as similarly described above.

At 1906, another request from the user for access to the resource is intercepted at the firewall. For example, the firewall can detect if the same user (e.g., based on user name and IP address) is attempting to access the same resource, such as similarly described above.

At 1908, the firewall determines whether the timestamp for the authentication factor is expired based on the authentication profile. For example, if the timestamp has expired, the firewall can enforce MFA requirements based on the authentication profile to require that the user re-authenticate in order to access the resource again. As another example, if the timestamp has not expired, but the firewall detects another security issue associated with the session or user, then the firewall can enforce a security policy that can prevent the user from accessing the resource or block/drop the session (e.g., the firewall can apply User ID, App ID, Content ID, or other checks and security related policies to the user/session even if the authentication policy check is successful), such as also described above.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
    a processor configured to:
        monitor a plurality of sessions at a firewall;
        log a plurality of failed or timed out attempts to authenticate at the firewall in a log;
        analyze the log for a pattern of the failed or timed out attempts to authenticate at the firewall to identify potentially compromised credentials for authentication;
        determine that a set of credentials for authentication have been compromised based on the analysis of the log, wherein the log includes a first threshold number of successful authentication events for a first authentication factor followed by a second threshold number of timed-out authentication events for a second authentication factor, wherein the first authentication factor is distinct from the second authentication factor, and wherein the second threshold number of timed-out authentication events for the second authentication factor correspond to timed-out authentication attempts based on an authentication timeout setting associated with the second authentication factor; and
        perform a responsive action based on determining that the set of credentials for authentication have been compromised based on the analysis of the log that determines that a number of monitored authentication success events for the first authentication factor exceeds the first threshold number of successful authentication events for the first authentication factor and that a number of monitored authentication failure events for the second authentication factor exceeds the second threshold number of timed-out authentication events for the second authentication factor; and
    a memory coupled to the processor and configured to provide the processor with instructions.

2. The system recited in claim 1, wherein the firewall performs multifactor authentication as a network service.

3. The system recited in claim 1, wherein the log is an authentication log that includes logged authentication related events.

4. The system recited in claim 1, wherein the pattern of the failed or timed out attempts to authenticate for a first user at the firewall corresponds to the first authentication factor.

5. The system recited in claim 1, wherein the pattern of the failed or timed out attempts to authenticate for a first user at the firewall corresponds to the first authentication factor and a single endpoint.

6. The system recited in claim 1, wherein the pattern of the failed or timed out attempts to authenticate for a first user at the firewall corresponds to the first authentication factor and a plurality of endpoints.

7. The system recited in claim 1, wherein the pattern of the failed or timed out attempts to authenticate for a first user at the firewall corresponds to the second authentication factor.

8. The system recited in claim 1, wherein the pattern of the failed or timed out attempts to authenticate for a first user at the firewall corresponds to the second authentication factor and a single endpoint.

9. The system recited in claim 1, wherein the pattern of the failed or timed out attempts to authenticate for a first user at the firewall corresponds to the second authentication factor and a plurality of endpoints.

10. The system recited in claim 1, wherein the processor is further configured to:
generate an alert or log a warning based on determining that an endpoint has been compromised based on the analysis of the log.

11. A method, comprising:
monitoring a plurality of sessions at a firewall;
logging a plurality of failed or timed out attempts to authenticate at the firewall in a log;
analyzing the log for a pattern of the failed or timed out attempts to authenticate at the firewall to identify potentially compromised credentials for authentication;
determining that a set of credentials for authentication have been compromised based on the analysis of the log, wherein the log includes a first threshold number of successful authentication events for a first authentication factor followed by a second threshold number of timed-out authentication events for a second authentication factor, wherein the first authentication factor is distinct from the second authentication factor, and wherein the second threshold number of timed-out authentication events for the second authentication factor correspond to timed-out authentication attempts based on an authentication timeout setting associated with the second authentication factor; and
performing a responsive action based on determining that the set of credentials for authentication have been compromised based on the analysis of the log that determines that a number of monitored authentication success events for the first authentication factor exceeds the first threshold number of successful authentication events for the first authentication factor and that a number of monitored authentication failure events for the second authentication factor exceeds the second threshold number of timed-out authentication events for the second authentication factor.

12. The method of claim 11, wherein the pattern of the failed or timed out attempts to authenticate for a first user at the firewall corresponds to the first authentication factor.

13. The method of claim 11, wherein the pattern of the failed or timed out attempts to authenticate for a first user at the firewall corresponds to the first authentication factor and a single endpoint.

14. The method of claim 11, wherein the pattern of the failed or timed out attempts to authenticate for a first user at the firewall corresponds to the first authentication factor and a plurality of endpoints.

15. The method of claim 11, further comprising:
generating an alert or logging a warning based on determining that an endpoint has been compromised based on the analysis of the log.

16. A computer program product, the computer program product being embodied in a non-transitory, tangible computer readable storage medium and comprising computer instructions for:
monitoring a plurality of sessions at a firewall;
logging a plurality of failed or timed out attempts to authenticate at the firewall in a log;
analyzing the log for a pattern of the failed or timed out attempts to authenticate at the firewall to identify potentially compromised credentials for authentication;
determining that a set of credentials for authentication have been compromised based on the analysis of the log, wherein the log includes a first threshold number of successful authentication events for a first authentication factor followed by a second threshold number of timed-out authentication events for a second authentication factor, wherein the first authentication factor is distinct from the second authentication factor, and wherein the second threshold number of timed-out authentication events for the second authentication factor correspond to timed-out authentication attempts based on an authentication timeout setting associated with the second authentication factor; and
performing a responsive action based on determining that the set of credentials for authentication have been compromised based on the analysis of the log that determines that a number of monitored authentication success events for the first authentication factor exceeds the first threshold number of successful authentication events for the first authentication factor and that a number of monitored authentication failure events for the second authentication factor exceeds the second threshold number of timed-out authentication events for the second authentication factor.

17. The computer program product recited in claim 16, wherein the pattern of the failed or timed out attempts to authenticate for a first user at the firewall corresponds to the first authentication factor.

18. The computer program product recited in claim 16, wherein the pattern of the failed or timed out attempts to authenticate for a first user at the firewall corresponds to the first authentication factor and a single endpoint.

19. The computer program product recited in claim 16, wherein the pattern of the failed or timed out attempts to authenticate for a first user at the firewall corresponds to the first authentication factor and a plurality of endpoints.

20. The computer program product recited in claim 16, further comprising computer instructions for:
generating an alert or logging a warning based on determining that an endpoint has been compromised based on the analysis of the log.

21. The system recited in claim 1, wherein the processor is further configured to:
update a user ID record in the log with at least two timestamps per authentication profile in the event of a successful completion of the first authentication factor, including a first timestamp at which the first authentication factor was successfully completed and a second timestamp at which the second authentication factor was successfully completed or failed.

22. The system recited in claim 1, wherein the log is an authentication log that includes logged authentication related events, and wherein the processor is further configured to:

correlate a plurality of authentication log events with a plurality of system log events to automatically identify a set of compromised credentials and a compromised endpoint that is attempting to request access using the set of compromised credentials.

\* \* \* \* \*

UNITED STATES PATENT AND TRADEMARK OFFICE
CERTIFICATE OF CORRECTION

Page 1 of 1

PATENT NO. : 10,367,784 B2
APPLICATION NO. : 15/281939
DATED : July 30, 2019
INVENTOR(S) : Ashwath Sreenivasa Murthy It is certified that error appears in the above-identified patent and that said Letters Patent is hereby corrected as shown below:

In the Specification

In Column 10, Line 19, delete "WA-related" and insert --MFA-related--, therefor.
In Column 13, Line 1, delete "WA" and insert --MFA--, therefor.
In Column 13, Line 13, delete "WA" and insert --MFA--, therefor.
In Column 29, Line 64, delete "WA" and insert --MFA--, therefor.
In Column 30, Line 13, delete "WA/authentication" and insert --MFA/authentication--, therefor.
In Column 30, Line 60, delete "WA" and insert --MFA--, therefor.
In Column 30, Line 62, delete "WA/authentication" and insert --MFA/authentication--, therefor.

Signed and Sealed this
Eighteenth Day of August, 2020

Andrei Iancu
*Director of the United States Patent and Trademark Office*